(12) United States Patent
Liang et al.

(10) Patent No.: US 11,312,846 B2
(45) Date of Patent: Apr. 26, 2022

(54) LOW DENSITY FOAMED THERMOPLASTIC VULCANIZATE COMPOSITIONS

(71) Applicant: Celanese International Corporation, Irving, TX (US)

(72) Inventors: Li Liang, Shanghai (CN); Toshiaki Yamaguchi, Kanagawa (JP); Weiqian Zhang, Shanghai (CN); Peite Bao, Shanghai (CN); Yi Ping Ni, Shanghai (CN); Eric Paul Jourdain, Rhode Saint Genese (BE)

( * ) Notice: Subject to any disclaimer, the term of this patent is extended or adjusted under 35 U.S.C. 154(b) by 97 days.

(21) Appl. No.: 16/770,386

(22) PCT Filed: Nov. 2, 2018

(86) PCT No.: PCT/US2018/058999
§ 371 (c)(1),
(2) Date: Jun. 5, 2020

(87) PCT Pub. No.: WO2019/112724
PCT Pub. Date: Jun. 13, 2019

(65) Prior Publication Data
US 2020/0377709 A1    Dec. 3, 2020

Related U.S. Application Data

(60) Provisional application No. 62/595,154, filed on Dec. 6, 2017.

(51) Int. Cl.
*C08L 23/06* (2006.01)
*C08J 9/228* (2006.01)
*C08L 23/16* (2006.01)

(52) U.S. Cl.
CPC ............... *C08L 23/16* (2013.01); *C08J 9/228* (2013.01); *C08J 2203/22* (2013.01); *C08J 2323/16* (2013.01); *C08J 2423/12* (2013.01)

(58) Field of Classification Search
CPC ............... C08L 23/16; C08L 2205/025; C08L 2205/03; C08L 2205/18; C08L 2205/22; C08L 2207/04; C08L 23/12; C08L 2207/322; C08J 9/228; C08J 2203/22; C08J 2323/16; C08J 2423/12
See application file for complete search history.

(56) References Cited

U.S. PATENT DOCUMENTS

| | | | |
|---|---|---|---|
| 2007/0254971 A1* | 11/2007 | De Vogel | B29C 70/66 521/59 |
| 2010/0119855 A1* | 5/2010 | Ouhadi | B29C 45/1657 428/515 |
| 2013/0101826 A1* | 4/2013 | Haug | C08J 9/32 428/319.3 |
| 2016/0347946 A1* | 12/2016 | Shannon | C08L 23/12 |

* cited by examiner

*Primary Examiner* — Kara B Boyle
(74) *Attorney, Agent, or Firm* — Dority & Manning, P.A.

(57) ABSTRACT

The present disclosure relates to TPV compositions suitable for foaming, as well as foamed TPV compositions, methods of making the foregoing, and applications of various foamed TPV compositions, including in glass run channels. The TPV compositions comprise an at least partially vulcanized rubber component dispersed within a thermoplastic component comprising a first thermoplastic resin. According to some aspects, the TPV composition may be combined with a high melt-strength thermoplastic resin, and in particular a high melt-strength polypropylene-based thermoplastic resin, to make a foamable TPV composition. The foamable TPV composition (with or without high melt-strength thermoplastic resin) is then coextruded or otherwise combined with foaming agent (preferably comprising thermo-expandable microspheres) to form the foamed composition. Foamed compositions according to various aspects are suitable for use in glass run channels for automobiles, and in particular in the base and/or sidewall portions of such glass run channels.

20 Claims, 5 Drawing Sheets

LOW DENSITY FOAMED THERMOPLASTIC VULCANIZATE COMPOSITIONS

CROSS-REFERENCE OF RELATED APPLICATIONS

This application is a National Phase Application claiming priority to PCT Application Serial No. PCT/US2018/058999, filed Nov. 2, 2018, which claims the benefit of priority from U.S. Provisional Application No. 62/595,154, filed Dec. 6, 2017, and the disclosures of which are incorporated herein by reference in their entirety.

FIELD OF THE INVENTION

This invention relates to foamed articles made using thermoplastic vulcanizate compositions, and in particular to glass run channels, weatherstrips, and other automobile components made at least in part using foamed thermoplastic vulcanizate compositions. The invention also relates to the thermoplastic vulcanizate compositions suitable for foaming, and other potential applications of such compositions.

BACKGROUND OF THE INVENTION

Thermoplastic elastomers (TPE) are both elastomeric and thermoplastic. They are distinguished from thermoset rubbers which are elastomeric but not thermoplastic due to the cross-linking or vulcanization of the rubber, and are distinguished from general thermoplastics which are generally stiff and hard, but not elastomeric.

Thermoplastic vulcanizates (TPVs) are a class of TPE in which cross-linked rubber forms a dispersed, particulate, elastomeric phase within a thermoplastic phase of a stiff thermoplastic such that TPE properties are achieved. TPVs or TPV compositions are conventionally produced by dynamic vulcanization. Dynamic vulcanization is a process whereby a rubber component is cross-linked, or vulcanized, under intensive shear and mixing conditions within a blend of at least one non-vulcanizing thermoplastic polymer component at or above the melting point of that thermoplastic. Typically, the rubber component forms cross-linked, elastomeric particles dispersed uniformly in the thermoplastic. See, for example, U.S. Pat. Nos. 4,130,535; 4,311,268; 4,594,390; and 6,147,160. Dynamically vulcanized thermoplastic elastomers consequently have a combination of both thermoplastic and elastic properties. Conventional plastic processing equipment can extrude, inject, or otherwise mold, and thus press and shape TPV compositions into useful products alone or in composite structures with other materials.

TPEs and TPVs can be foamed by incorporating a modifier or filler or other components. See, for instance, WIPO Publications WO2004/016679 and WO2007/0044123. WO 2013/062685 suggests the use of thermo-expandable microspheres in creating foamed TPV compositions, asserting that such foamed compositions will have homogeneous closed cell structures, and may therefore exhibit superior relaxation performance, low water absorption, and desirably soft touch. Other references of potential interest along these and similar lines include: WIPO Publication WO2015/095987; U.S. Pat. Nos. 5,728,744, 6,268,438, 6,288,171, 6,399,710, 6,720,361, 6,713,520, 7,294,675, 7,319,121, 7,326,471, 7,652,097, 7,829,623, 7,964,672, and 8,178,625; U.S. Patent Publication Nos. 2010/0119855, 2013/0101826, and 2013/072584.

Foamed TPVs enjoy use in several areas, including glass run channels for automobiles. See, for example, U.S. Pat. Nos. 8,327,584, 9,254,736, 9,493,061; Japanese Patent Nos. JP4429671B, JP5972200B, JP4660016B, JP3964669B, JP5481278B, JP5468970B, JP5405868B, JP5510674B; Japanese Patent Publication No. 2005-088718; Chinese Patent Publication No. CN104072881A; Korean Patent Publication No. KR20160083324A; and Korean Patent No. KR101013827B.

However, foamed TPVs typically require moderate to high specific gravity (e.g., greater than 0.5 g/cc, such as 0.6 g/cc or greater, such as within the range from 0.6 to 0.8 g/cc) in order to maintain adequate physical properties (e.g., surface smoothness, tensile strength) for use in various applications. For instance, in automobile applications such as weatherstrips, seals, or glass run channels, although lower-density (and therefore lighter) TPVs would provide desirable weight reduction, foaming to lower densities may render the TPV too weak, too rough, and/or too likely to tear upon deformation, for the intended purpose. The present inventors have found that it is possible to achieve suitable properties in automotive applications such as glass run channels even when utilizing very low specific gravity TPVs (e.g., having 0.55 g/cc or less, preferably less than 0.5 g/cc, such as less than 0.48 g/cc).

SUMMARY OF THE INVENTION

According to some embodiments, these effects are achieved at least in part by foaming with particular thermo-expandable microspheres. According to yet further embodiments, these effects may be enhanced by blending a TPV composition (vulcanized) and/or TPV formulation (prior to vulcanization) with a high melt-strength thermoplastic resin (e.g., a polypropylene having high-molecular weight tails and/or rheological characteristics of long-chain-branching).

Therefore, the present invention in some aspects includes articles of manufacture, such as glass run channels, being at least partially made of foamed thermoplastic vulcanizate. Preferably, the foamed thermoplastic vulcanizate has specific gravity less than 0.5 g/cc, such as 0.48 g/cc or less, or 0.45 g/cc or less, and is foamed using thermo-expandable microspheres.

In yet other aspects, the present invention includes TPV compositions, and methods of making such compositions, in which physical properties (e.g., tensile strength and/or surface smoothness) are adequately maintained even when the TPV composition is foamed to very low density (e.g., 0.55 g/cc or less, preferably less than 0.5 g/cc, such as 0.48 g/cc or less), especially when foamed with thermo-expandable microspheres. These and other embodiments may include combining (i) a foamable TPV composition with (ii) a foaming agent (which preferably is or includes thermo-expandable microspheres) to form a foamed TPV composition. The aforementioned combining may include any suitable means for effecting foaming when combining the two ingredients, such as coextrusion, melt-mixing, or the like. In certain embodiments, the foamed TPV composition may be employed as at least a part of a glass run channel, weatherseal, or other automotive sealing application.

Foamable TPV compositions according to some embodiments may include (i) a TPV composition or TPV formulation comprising a rubber component and thermoplastic component; (ii) a TPV composition or TPV formulation comprising a rubber component and thermoplastic component, said thermoplastic component comprising a high melt-strength thermoplastic resin (e.g., a high melt-strength polypropylene resin); and/or (iii) a composition made by blending (1) a TPV composition and/or formulation according to (i) and/or (ii) with (2) a high melt-strength thermoplastic resin.

The rubber component of such TPV compositions may comprise any cross-linkable (prior to vulcanization) and/or cross-linked (after vulcanization) rubber; ethylene-α-olefin copolymers such as ethylene-propylene (EP) copolymers are preferred, with ethylene-propylene-polyene terpolymers (such as ethylene-propylene-diene or "EPDM" terpolymers) being particularly preferred. When the rubber is cross-linkable but not yet cross-linked, one may refer to the composition as a TPV formulation; whereas the term TPV composition otherwise indicates that the rubber is at least partially cross-linked. The thermoplastic component includes any thermoplastic resin suitable for making TPVs, such as a propylene homo- or co-polymer. Preferably, in embodiments in which the thermoplastic component includes a high melt-strength thermoplastic resin, such high melt-strength thermoplastic resin is different from the thermoplastic resin(s) otherwise constituting the thermoplastic component. The high melt-strength thermoplastic resin employed in certain embodiments is preferably a polypropylene resin, such as a high melt-strength homopolypropylene resin, having melt strength of at least 20 cN, preferably at least 30 cN; MWD greater than 5; and/or flexural modulus (1% secant) within the range from 2000 to 2500 MPa.

In sum, then, a foamed TPV composition according to various embodiments may be made by combining: (i) TPV composition and/or formulation with foaming agent; (ii) TPV composition comprising high melt-strength polypropylene with foaming agent; or (iii) TPV composition according to (i) or (ii) with high melt-strength polypropylene and further with foaming agent, wherein the foaming agent is or includes thermo-expandable microspheres. Also provided herein are methods for making foamable TPV compositions that include combining such ingredients. Suitable blending methods include coextrusion, dry blending, melt-mixing, melt blending, and the like.

Yet further aspects provide articles made from the foamed TPV compositions, and methods for making them. Articles made from foamed TPV compositions according to some embodiments may include all or any portion of weatherseals, gaskets, splines, hoses, belts, glass run channels, handle grips, cables, among others. Certain embodiments in particular contemplate a glass-run channel formed at least in part from the foamed TPV compositions according to some embodiments. For instance, the TPV compositions of some embodiments may be particularly well-suited to forming a foamed glass-run-channel base for use in automotive applications.

DETAILED DESCRIPTION OF SPECIFIC EMBODIMENTS

Figure 1:
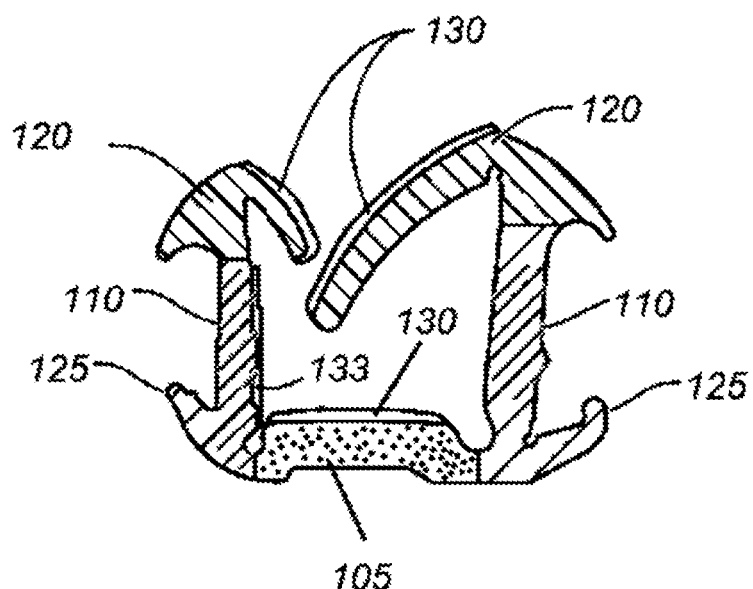
FIG. 1 is a cross-sectional illustration of a glass run channel in accordance with some embodiments.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

Definitions

As used herein, a "polymer" may be used to refer to homopolymers, copolymers, interpolymers, and terpolymers. Homopolymers are polymers made from a single type of monomer (e.g., homopolypropylene, made from propylene). Unless context indicates otherwise, "copolymers" may refer to polymers made from two or more types of monomers (including both, e.g., ethylene-propylene copolymers and ethylene-propylene-polyene terpolymers, as well as tetrapolymers, and polymers made from 5 or more monomer types); and "terpolymers" refer to a sub-set of copolymers made from three monomer types (e.g., ethylene-propylene-polyene terpolymers).

As used herein, when a polymer is referred to as comprising a monomer, the monomer is present in the polymer in the polymerized form of the monomer or in the derivative form of the monomer.

When a polymer composition or blend is said herein to comprise a certain percentage, wt %, of a monomer, that percentage of monomer is based on the total amount of monomer units in all the polymer components of the composition or blend, unless otherwise stated.

"Elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber(s)," unless noted otherwise.

A "$C_x$" hydrocarbon or α-olefin or the like, where x is an integer, refers to a hydrocarbon, α-olefin, or the like having X carbon atoms. Thus, a $C_6$ α-olefin is an α-olefin having 6 carbon atoms (with a double bond connecting the 1 and 2 carbons). Similarly, a "$C_x$-$C_y$ α-olefin" or a "$C_{x-y}$ α-olefin" is an α-olefin having from x to y carbon atoms, inclusive (e.g., a $C_6$-$C_{10}$ or $C_{6-10}$ α-olefin is an α-olefin having 6, 7, 8, 9, or 10 carbon atoms).

A composition "free of" a component refers to a composition substantially devoid of the component, or comprising the component in an amount of less than about 0.01 wt. %, by weight of the total composition.

A "thermoplastic vulcanizate" is broadly defined as any material that includes a dispersed, at least partially vulcanized, rubber component within a thermoplastic component. A thermoplastic vulcanizate material can further include additive oil, other ingredients, other additives, or combinations thereof.

The term "vulcanizate" means a composition that includes some component (e.g., rubber) that has been vulcanized. The term "vulcanized" is defined herein in its broadest sense, as reflected in any issued patent, printed publication, or dictionary, and refers in general to the state of a composition after all or a portion of the composition (e.g., cross-linkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization, e.g., curing (cross-linking) that results in a measurable change in pertinent properties, e.g., a change in the melt flow index (MFI) of the composition by 10% or more (according to any ASTM-1238 procedure). In at least that context, the term vulcanization encompasses any form of curing (cross-linking), both thermal and chemical, which can be utilized in dynamic vulcanization.

As used herein, the term "dynamic vulcanization" means vulcanization or curing of a curable rubber component blended with a thermoplastic component under conditions of shear at temperatures sufficient to plasticize the mixture. In at least one embodiment, the rubber component is simultaneously cross-linked and dispersed as micro-sized particles within the thermoplastic component. Depending on the degree of cure, the rubber component to thermoplastic component ratio, compatibility of the rubber component and thermoplastic component, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the cross-linkable rubber is extractable in boiling xylene, subsequent to vulcanization (preferably dynamic vulcanization), e.g., cross-linking of the rubber phase of the TPV. For example, in a TPV comprising a partially vulcanized rubber at least 5 wt % and less than 10, 20, 30, or 50 wt % (in varying embodiments) of the cross-linkable rubber is extractable from the specimen of the TPV in boiling xylene (said wt % based upon the total weight of rubber present in the TPV specimen). The percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in Column 4, lines 19-50 of U.S. Pat. No. 4,311,628, which description is hereby incorporated by reference.

As used herein, a "fully vulcanized" (or fully cured or fully cross-linked) rubber is one wherein less than 5 wt % of the cross-linkable rubber is extractable in boiling xylene, subsequent to vulcanization (preferably dynamic vulcanization), e.g., cross-linking of the rubber phase of the TPV. For example, in a TPV comprising a fully vulcanized rubber, less than 4, 3, 2, or even 1 wt % of the cross-linkable rubber is extractable from the specimen of the TPV in boiling xylene. In some embodiments, in a TPV comprising a fully vulcanized rubber, from 0.5 to 2.0 wt %, such as from 0.1 to 2.0 wt %, of the cross-linkable rubber is extractable from the specimen of the TPV in boiling xylene.

As used herein, "extender oil" and "processing oil" may have similar compositions, or be selected from the same or similar compounds. The terms are used to distinguish the timing in the manufacturing cycle of elastomeric compositions (including TPVs) at which the oil is introduced. "Extender oil" is oil that is added to or otherwise incorporated with an elastomer following its polymerization, e.g., incorporated (along with any other desired additives) as part of the elastomer pellets, bales, or the like that are shipped or otherwise provided to downstream manufacturers, who in turn process the elastomer into intermediate products (including TPVs) and/or finished goods. "Processing oil" or "process oil" is formulated with the elastomer during such downstream manufacturing (e.g., during extrusion, mixing, or other processing of the elastomer, including formation into a TPV). Thus, in the context of thermoplastic vulcanizate compositions, such as those discussed herein, "extender oil" may be present in a rubber component used in manufacturing the TPV; "process oil" is oil that is added during the TPV manufacturing process. Sometimes, the total of both extender oil and process oil may be cumulatively referred to as "additive oil."

As used herein, a "Group I oil", a "Group II oil", a "Group III oil", a "Group IV oil" (also referred to as a polyalphaolefin or "PAO") and a "Group V oil" refer to the respective base stock oil group as understood in accordance with the American Petroleum Institute (API)'s categorization of base stock oils (set forth in Annex E of API 1509, 17th Edition, Addendum 1 (March 2015), incorporated herein by reference). For instance, a Group I oil is a petroleum-derived base oil or basestock oil having less than 90 wt % saturates (as determined in accordance with ASTM D2007), greater than 300 wppm sulfur (as determined in accordance with ASTM D1552, ASTM D2622, ASTM D3120, ASTM D4294, or ASTM D4297, with ASTM D4294 prevailing in case of conflicting results among those methods), and having a viscosity index ranging from 80 to 120 (as determined by ASTM D2270). Likewise, a Group II oil is a petroleum-derived base oil or basestock oil having greater than or equal to 90 wt % saturates, less than or equal to 300 wppm sulfur content, and a viscosity index ranging from 80 to 120 (each property determined by the same methods identified for Group I oils). Group III, IV, and V oils are similarly in accordance with their description in Annex E of API 1509.

Foamed TPV Compositions

As noted, foamed TPV compositions according to various embodiments may be made by coextruding or otherwise combining: (i) TPV composition or formulation with thermo-expandable microspheres; (ii) TPV or TPV formulation comprising a high-melt-strength thermoplastic resin with thermo-expandable microspheres; and/or (iii) TPV or TPE formulation with high-melt-strength thermoplastic resin and further with thermo-expandable microspheres.

Below we discuss suitable TPV or TPE compositions, followed by discussion of suitable high-melt-strength thermoplastic resins utilized according to some embodiments, and finally by discussion of thermo-expandable microspheres suitable for the various embodiments. Various applications of the TPV foam compositions are then reviewed, including glass-run channels for automobiles.

The inventors have found that the degree of foaming of the TPV formulation can be controlled by the amount of thermoplastic resin used in the TPV formulation as well as the type of thermoplastic resin—specifically the melt flow rate of the thermoplastic resin.

Thermoplastic Vulcanizate

Thermoplastic vulcanizate (TPV) compositions of various embodiments may comprise, consist essentially of, or consist of: (a) an at least partially vulcanized rubber component dispersed within a continuous thermoplastic matrix; (b) oil; and, optionally, (c) one or more additives (e.g., one or more fillers, foaming agents, or the like). As used in this context, "consist essentially of" means that the TPV composition is free of other materials except those minor impurities (e.g., 0.1 wt % or less) that one would typically expect in normal commercial operations. For instance, a single process line may be used to in a continuous process to create multiple different types of materials in series, and some residuals (e.g., residual polymer, monomer, curative, additives, or other material) from previous product campaigns may acceptably be left in such equipment.

Such TPVs are formed by dynamically vulcanizing a TPV formulation. The TPV formulation of various embodiments comprises (i) a rubber component (which may or may not be oil-extended), (ii) a thermoplastic resin, (iii) a propylene-based elastomer (PBE), (iv) a vulcanizing agent or curative; (v) processing oil; and (vi) optionally, one or more additives (including, e.g., cure accelerators, metal oxides, acid scavengers, flame retardants, fillers, stabilizers, and the like). The TPV may therefore alternatively be considered the product of dynamic vulcanization of the TPV formulation.

A TPV composition may instead be referred to as a TPE composition where the rubber component is not vulcanized; thus, a TPV formulation not yet subjected to cross-linking reaction may also be considered a particular type of TPE composition.

Formation of the TPV and its resultant properties will first be described, followed by a more detailed description of suitable rubber components, thermoplastic components, vulcanizing agents, processing oil, and additives.

Forming TPVs

As those skilled in the art appreciate, dynamic vulcanization includes a process whereby a rubber that is undergoing mixing with a thermoplastic resin is cured (i.e., cross-linked, or vulcanized). The rubber is cross-linked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously cross-linked and dispersed as fine particles within the thermoplastic matrix.

In general, the dynamic vulcanization of the TPV formulation takes place within a reactor, such as an extruder, melt-mixer, or other reactive mixing device (described in more detail below). Furthermore, not all components of the TPV formulation need necessarily be introduced to the reactor at the same time.

For instance, dynamic vulcanization according to some embodiments proceeds as follows: The rubber component and thermoplastic component are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend. The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative, or after dynamic vulcanization—or at any two or more of the foregoing points in the process.

Methods according to particular embodiments include "preloading" process oil—meaning that a portion of the process oil is introduced to the TPV formulation before the curative is introduced. Surprisingly, it has been found that some degree of oil preloading may result in increased tensile properties of the resulting TPV, without increasing hardness, which may be desired in some foaming applications.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These wt % s are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of such embodiments of the present invention is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WIPO Patent Publication No. WO 2004/009327 A1, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

Rubber Component

The rubber component of TPV formulations of various embodiments is preferably a cross-linkable (vulcanizable) rubber component, such that upon dynamic vulcanization, the rubber component in the resulting TPV composition (i.e., resulting from processing, including by dynamic vulcanization, of the TPV formulation) of such embodiments is at least partially cross-linked, preferably fully cross-linked.

Any rubber suitable for use in the manufacture of TPVs can be used to manufacture (and be present in) the TPV compositions of some embodiments of the present invention. The term "rubber" refers to any natural or synthetic polymer exhibiting elastomeric properties, any may be used herein synonymously with "elastomer." The rubber component may comprise one rubber, or a mix of two or more rubbers.

For example, the rubber component can be any olefin-containing rubber such as ethylene-propylene copolymers (EPM), including in particular saturated compounds that can be vulcanized using free radical generators such as organic peroxides, as described in U.S. Pat. No. 5,177,147. Other rubber components can include ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms.

The rubber component can also be a butyl rubber. The term "butyl rubber" includes a polymer that predominantly includes repeat units from isobutylene, but also includes a few repeat units of a monomer that provides a site for cross-linking. Monomers providing sites for cross-linking include a polyunsaturated monomer such as a conjugated diene or divinyl benzene. In one or more embodiments of the invention, the butyl rubber polymer can be halogenated to further enhance reactivity in cross-linking. Those polymers are referred to as "halobutyl rubbers."

Further, the rubber component can be homopolymers of conjugated dienes having from 4 to 8 carbon atoms and rubber copolymers having at least 50 wt % repeat units from at least one conjugated diene having from 4 to 8 carbon atoms. The rubber component can also be synthetic rubber, which can be nonpolar or polar depending on the comonomers. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers can also be used. Examples of those include maleated EPDM, and epoxy-functionalized natural rubbers.

A list of preferred rubber component include, but are not limited to, ethylene-propylene rubber, ethylene-propylene-diene rubber, natural rubber, butyl rubber including halobutyl rubber, halogenated rubber copolymer of p-alkystyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 wt. % repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated anhydride of a dicarboxylic acid, or combinations thereon.

The rubber component is preferably present in the TPV formulation (and/or present in the resulting TPV) in an amount within the range from 10 to 40 wt %, preferably 15 to 30 wt %, such as 16 to 28 wt %, based on total weight of the TPV, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation (and/or resulting TPV composition) of some embodiments may optionally comprise 5 to 30 wt %, such as 10 to 25 wt % or 12 to 24 wt % (with ranges from any of the foregoing lows to any of the foregoing highs also contemplated) of extender oil, where the rubber component includes extender oil.

Alternatively, the rubber component amount in the TPV composition may be expressed in terms of wt % inclusive of any extender oil that may be present in the rubber component. In such cases, the rubber component (inclusive of extender oil) may be present in the TPV composition within the range from 15 to 70 wt %, preferably 20 to 65 wt %, such as 30 to 60 wt % (again, with ranges from any of the foregoing lows to any of the foregoing highs also contemplated in various embodiments).

Thermoplastic Component

The TPV formulations and/or TPV compositions of various embodiments include a thermoplastic component comprising at least one olefinic thermoplastic resin. The thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic component may contain one or more polyolefins, including polyolefin homopolymers and poly olefin copolymers.

In certain embodiments, the thermoplastic component may additionally include a propylene-based elastomer such as Vistamaxx™ propylene-based elastomer available from ExxonMobil Chemical Company. In yet further embodiments, the thermoplastic component may also or instead include a high-melt-strength thermoplastic resin (discussed in more detail later).

Thermoplastic Resins: Illustrative thermoplastic resins suitable for inclusion in the thermoplastic component according to various embodiments may be prepared from monoolefin monomers including, but not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked in the resulting TPV (i.e., it is non-vulcanizable or non-cross-linkable as present in the TPV formulation, prior to dynamic vulcanization).

In preferred embodiments, the thermoplastic resin is an olefinic thermoplastic resin that comprises, or consists of, polypropylene. The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$ to $C_{10}$ α-olefins.

The thermoplastic resin may have a melting temperature of at least 110° C., or at least 120° C., or at least 130° C., and may range from 110° C. to 170° C. or higher as measured by Differential Scanning calorimetry (DSC). The procedure for DSC is described as follows: 6 to 10 mg of a sheet of the resin pressed at approximated 200° C. to 230° C. is removed with a punch die and then annealed at room temperature (about 23° C.) for 240 hours. At the end of this period, the sample is placed in a Differential Scanning calorimeter (Perkin Elmer 7 Series Thermal Analysis System) and cooled at a rate of 10° C./min to −50° C. to −70° C. The sample is then heated at a rate of 20° C./min to attain a final temperature of 200° C. to 220° C. The thermal output during this heating cycle is recorded as the area under the melting peak of the sample and is measured in Joules as a measure of the heat of fusion. The melting temperature is recorded as the temperature of the greatest heat absorption within the range of melting of the sample.

In some embodiments, the thermoplastic resin has MFR of 15 g/10 min or less, more preferably 10 or less, 5 or less, 3 or less, or even 1 or less, in some embodiments (measured per ASTM D-1238, at 230° C. and 2.16 kg mass). For instance, MFR of the thermoplastic resin may be within the range from a low of any one of 0.01, 0.1, and 0.5 g/10 min to a high of any one of 1, 3, 5, 10, and 15 g/10 min (ASTM D-1238, 230° C. and 2.16 kg). In certain of these embodiments, the thermoplastic component comprises only thermoplastic resin with MFR according to the foregoing description.

In yet other embodiments, however, the TPV composition (and/or the TPV formulation) may comprise two or more thermoplastic resins. In particular, the TPV composition may comprise (i) a thermoplastic resin having MFR of 15 g/10 min or less (or other MFR per the just-given description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. For instance, of the combined weight of the low-MFR and high-MFR thermoplastic resin, 51 to 99 wt % is low-MFR, such as 55 to 95 wt %, or 55 wt % to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

Propylene-Based Elastomer: In yet other embodiments, the thermoplastic component may comprise a propylene-based elastomer (PBE). A PBE may be present in the TPV formulation (and/or resulting TPV composition) of some embodiments within the range from 3 to 20 wt %, preferably from 4 to 15 wt %, such as 4 to 12 wt % or 5 to 10 wt %, with ranges from any of the foregoing lows to any of the foregoing highs also contemplated in various embodiments. Although it is possible to blend (e.g., coextrude, melt-mix or the like) PBE with a vulcanized TPV material to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

A PBE may be present in the TPV formulation (and/or resulting TPV composition) of some embodiments within the range from 3 to 20 wt %, preferably from 4 to 15 wt %, such as 4 to 12 wt % or 5 to 10 wt %, with ranges from any of the foregoing lows to any of the foregoing highs also contemplated in various embodiments. Although it is possible to blend (e.g., coextrude, melt-mix or the like) PBE with a vulcanized TPV material to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

Preferred PBEs are those in accordance with the propylene-based elastomer described in Paragraphs [0055]-[0075] of WIPO Patent Publication No. WO 2015/095987 having international filing date 24 Dec. 2013, which description is incorporated by reference herein. As set forth therein, the PBE preferably has reduced crystallinity and/or melting point as compared to highly isotactic polypropylene due to introduction of errors in the insertion of propylene. The PBE is generally devoid of any substantial intermolecular heterogeneity in tacticity and comonomer composition, and also generally devoid of any substantial heterogeneity in intramolecular composition distribution.

Particularly preferred PBEs in accordance with that description for use in embodiments of the present invention include copolymers of propylene and one or more comonomers selected from the group consisting of ethylene and $C_4$ to $C_{10}$ α-olefins; most preferred are propylene-ethylene copolymers. The PBE has at least 60 wt % units derived from propylene (based on total mass of the PBE), such as within the range from a low of any one of 60, 65, 70, 75, 80, 84, and 85 wt % to a high of any one of 85, 90, 92, 94, and 95 wt %, provided the high end of the range is greater than the low end. The balance of the PBE is preferably derived from ethylene, although in some embodiments the PBE may include one or $C_4$ to $C_{10}$ comonomers instead of or in addition to ethylene.

Preferred PBEs have one or more, preferably two or more or three or more, most preferably four or more, or all, of the following properties:

MFR of 1 to 20 g/10 min (ASTM D-1238, 230° C. and 2.16 kg). Most preferably, however, MFR of the PBE is within the range from 1 to 10, more preferably within the range from a low of 1 or 2 g/10 min to a high of 4 or 5 g/10 min;

Melting point $T_m$ of 105° C. or less, such as within the range from 25° C., 60° C., 70° C., or 90° C. to 105° C. (determined as by the DSC procedure described in the section above);

Heat of fusion ($H_f$) as determined by DSC (by the procedure described in the section above) of 80 J/g or less, such as within the range from a low of any one of 1, 3, 5, 6, and 7 J/g to a high of any one of 30, 35, 40, 45, 50, 60, 70, 75, and 80 J/g;

Triad tacticity of three propylene units, as measured by $^{13}C$ NMR, of at least 75%, such as within the range from 75, 80, 82, or 85% to 97% or 99%; and Density of 0.850 g/cc to 0.900 g/cc (measured at room temperature per ASTM D1505).

Some embodiments may include one or more different PBEs, i.e., propylene-based elastomers each having one or more different properties such as, for example, different comonomer or comonomer content. Such combinations of various propylene-based elastomers are all within the scope of the invention.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Optional High Melt-Strength Thermoplastic Resin: High melt-strength thermoplastic resins are discussed in more detail in a later section dedicated to this component of certain embodiments. Although many embodiments as described herein contemplate blending a dynamically vulcanized TPV composition with a high-melt-strength thermoplastic resin, according to some embodiments, the high melt-strength thermoplastic resin is instead incorporated into the TPV formulation (e.g., as part of the thermoplastic component of the TPV and/or TPV formulation) so that dynamic vulcanization occurs in the presence of the high-melt-strength thermoplastic resin. That is, it is specifically contemplated that some embodiments may include blending the high-melt-strength thermoplastic resin into a TPV formulation prior to or during dynamic vulcanization of the TPV formulation to form a foamable TPV composition according to various embodiments. In such embodiments, the high melt-strength thermoplastic resin may be added at an amount within the range from a low of 15, 20, or 25 wt % to a high of 30, 35, 40, 50, 60, 65, or 70 wt % of the high melt-strength thermoplastic resin, such wt % based on the total weight of the components of the TPV formulation.

Amount of Thermoplastic Component: In many embodiments, the thermoplastic component of a TPV composition and/or TPV formulation (comprising thermoplastic resin(s) and, optionally, PBE(s) and/or high-melt-strength thermoplastic resin(s)) makes up from 10 to 40 wt % of the TPV composition and/or TPV formulation, based on the total weight of the TPV or TPV formulation, as applicable. Other contemplated ranges include 15 to 30 wt % and 17 to 25 wt %, with ranges from any of the foregoing low ends to any of the foregoing highs ends also contemplated in various embodiments.

However, in certain embodiments in which the thermoplastic component comprises a high melt-strength thermoplastic resin, the thermoplastic component may comprise a larger share of the TPV composition and/or TPV formulation. For instance, the thermoplastic component in some such embodiments may make up within the range from a low of 25, 30, 35, 40, 45, 50, 55, or 60 wt % to a high of 35, 40, 45, 50, 55, 60, 65, 70, 75, 80, or 85 wt % of the TPV composition and/or TPV formulation, based on total weight of the TPV composition and/or formulation, and provided that the high end of the range is greater than the low end. For instance, contemplated ranges in some embodiments include 25 to 40 wt % or 25 to 50 wt % thermoplastic component; while contemplated ranges in yet other embodiments include 60 to 80 wt %, such as 60 to 85 wt %, of the TPV composition and/or TPV formulation.

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., an API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from Chevron-Texaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation and/or present in the TPV composition in amounts within the range from 5 to 40 wt %, preferably 10 to 30 wt %, such as 15 to 25 wt %, such wt % s based on total weight of the TPV formulation or TPV composition, as applicable, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation or TPV composition, as applicable), with ranges from any of the foregoing lows to any of the foregoing highs also contemplated.

Total additive oil (extender oil+process oil) may therefore be within the range from 5 to 350 phr (or 5 to 70 wt % based on total weight of TPV formulation or TPV composition, as applicable); preferably within the range from 150 to 250 phr (or 30 to 45 wt % based on total weight of TPV formulation or TPV composition).

Cure Agents

The TPV formulation also includes a vulcanizing agent, which may be at least in part consumed during dynamic vulcanization of the TPV formulation. Any vulcanizing agent that is capable of curing or cross-linking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046] to [0054] of PCT Application No. PCT/US15/65048, filed Dec. 10, 2015, which description is herein incorporated by reference.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

Blending TPV or TPE with Optional High-Melt-Strength Thermoplastic Resin

As noted previously, TPV compositions (vulcanized) and/or formulations (not yet vulcanized) according to some embodiments include a high-melt-strength thermoplastic resin in the thermoplastic component of the TPV composition and/or TPV formulation. However, in particular embodiments, the at least partially vulcanized TPV composition is also or instead blended (co-extruded, melt-mixed, or otherwise mixed) with a high-melt-strength thermoplastic resin so as to form a foamable TPV composition.

High melt-strength thermoplastic resins according to some embodiments may be composed of units derived from one or more $C_2$ to $C_{20}$ α-olefins. According to certain embodiments, the high melt-strength thermoplastic resin comprises at least 50 mol % units derived from propylene, and in particular, it may be a high melt-strength polypropylene resin in accordance with the description of Paragraphs [0077] to [0097] of WIPO Publication No. 2014/070384, and/or Paragraphs [00100] to [00120] of WIPO Publication No. WO2014/070386, which descriptions are incorporated by reference herein.

Thus, the high melt-strength thermoplastic resin according to some embodiments comprises at least 50 mol %, such as at least 75 mol %, 90 mol %, or 99 mol % units derived from propylene (such mol % determined on the basis of total moles of monomer-derived units in the polymer, and exclusive of any optional additives such as anti-oxidants, phosphites, and the like). The high melt-strength thermoplastic resin according to particular embodiments may be a high melt-strength homopolypropylene.

The high melt-strength thermoplastic resin may further have one or more, preferably two or more, most preferably three or more, four or more, or even all of the following properties:

Molecular weight distribution (MWD, Mw/Mn) greater than 3, preferably greater than 4 or even 5 or greater, such as within the range from a low of any one of 5, 5.1, 5.4, 5.5, 5.6, 5.8, 6, 6.1, 6.4, 6.7, and 7.0 to a high of any one of 6, 7, 8, 9, 10, 11, 12, 13, 14, 15, 16 provided the high end of the range is greater than the low end;

Melt strength greater than 15 cN, preferably greater than 20 cN (determined using an extensional rheometer at 190° C.); melt strength may be greater than 30, 35, 40, 45, or 50 cN, such as within the range from a low of 30, 35, 40, 45, 50, 55, 60, 65, or 70 cN to a high of 100, 125, 150, 175, 200, 225, 250, or 275 cN;

Heat distortion temperature greater than or equal to 80° C., 90° C., 95° C., 100° C., 110° C., 120° C. or 123° C., determined according to ASTM D648 using a load of 0.45 MPa (66 psi), such as within the range from a low of 80, 90, 95, 100, 110, 120 or 123° C. to a high of 200, 250, 300, 350, 400, 450, 500, 550, or 600° C.;

Flexural modulus (1% secant) at 1.26 mm/min per ASTM D790A (using a crosshead speed of 1.26 mm/min (0.05 in/min), and a support span of 50.8 mm (2.0 in) using an Instron machine) within the range from 1500 to 4000 MPa, such as within the range from a low of 1500, 1750, 2000, 2020, 2050, 2100, or 2150 MPa to a high of 1950, 2400, 2450, 2500, 2750, 3000, 3250, 3500, 3750, or 4000 MPa; and Tensile stress at yield (measured per ASTM D638, with a crosshead speed of 50.8 mm/min (2.0 in/min), and a gauge length of 50.8 mm (2.0 in), using an Instron Machine) within the range from a low of 20, 25, 27, 30, 33, 35, 36, or 37 MPa to a high of 40, 43, 45, 47, 50, 55, 60, 65, 70, 75, 80 or 85 MPa; and Notched Izod Impact Strength (ASTM D256 at room temperature (23° C.), using equipment made by Empire Technologies Inc.) within the range from a low of 0.5, 1, 5, 10, 20, 30, or 40 J/m to a high of 1, 30, 35, 45, 55, 60, 65, 70, 75, or 80 J/m (provided the high end of the range is greater than the low end).

The high melt-strength thermoplastic resin may also or instead have MFR (determined according to ASTM D1238 Condition L, 230° C. and 2.16 kg) within the range from 0.1 to 100 g/10 min, such as from a low of 0.5, 1.0, or 1.5 to a high of 3.0, 5.0, 10.0, or 60.0 g/10 min; density within the range from 0.85 to 0.95 g/cc, such as 0.88 to 0.92 g/cc; branching index (g') of at least 0.95, and/or an isopentad percentage of greater than 90%, 95%, or 99%. Further, the rheology of the high melt-strength thermoplastic resin may be such that it exhibits viscosity ratio within the range from 20, 25, 30, 35, 40, 45, or 50 to 60, 65, 70, 75, 80, 85, 90, or 95, determined from the ratio of (i) complex viscosity at 0.01 rad/s angular frequency to (ii) complex viscosity at 100 rad/s angular frequency, measured at a fixed strain of 10% at 190° C.

The branching index (g'vis, also referred to herein as g') is calculated using the output of the SEC-DRI-LS-VIS method (described in page 37 of U.S. Pat. No. 7,807,769 for g') as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g'vis is defined as:

$$g'_{vis} = \frac{[\eta]_{avg}}{kM_v^\alpha}.$$

The high melt-strength thermoplastic resin may optionally include one or more additives, such as fillers, scratch-resistant agents, plasticizers, antioxidants, phosphites, anti-cling additives, tackifiers, UV stabilizers, heat stabilizers, anti-blocking agents, release agents, anti-static agents, pigments, colorants, dyes, waxes, silica, extender oils, lubricants, talc, anti-fogging agents, foaming agents, flame/fire retardants, vulcanizing agents/accelerators, cure retarders, processing aids, tackifying resins, and any combination thereof, as detailed in Paragraphs [0099] to [00100] of WIPO Publication No. WO 2014/070384, which description is incorporated herein by reference.

Thermo-Expandable Microspheres

Although foaming agents are one of the potential additives suitable for inclusion in the TPV formulation, according to some embodiments, it is preferred to first obtain a foamable TPV composition that does not include foaming agent, and then to combine such foamable TPV composition with foaming agent, particularly where the foaming agent comprises thermo-expandable microspheres. Alternatively, if some amount of conventional foaming agent is present in the TPV composition, then such embodiments may optionally include combining the TPV with additional foaming agent.

Preferably, the foamable TPV composition comprises: (i) a TPV composition or TPV formulation; (ii) a TPV composition and/or TPV formulation comprising high melt-strength thermoplastic resin; and/or (iii) a composition made by combining (1) a TPV composition or TPV formulation and (2) high melt-strength thermoplastic resin. Preferable means of combining to make the composition (iii) include coextrusion, melt-mixing, blending, and the like.

Such foamable TPV composition is then combined with a foaming agent, preferably in a manner to both combine and form the foamed composition (suitable means of such combining, e.g., coextrusion, are discussed in more detail below).

The foaming agent of preferred embodiments is or comprises thermo-expandable microspheres. A thermo-expandable microsphere is broadly defined as a microsphere comprising a polymer shell and a propellant encapsulated therein. Examples are known in the art and described in, for example, U.S. Pat. Nos. 6,582,633 and 3,615,972, WIPO Publication Nos. WO 99/46320 and WO 99/43758, and contents of which hereby are incorporated by reference. Examples of such thermo-expandable microsphere include, for example, EXPANCEL™ products commercially available from Akzo Nobel N.V., such as EXPANCEL™ 950MB80 (a masterbatch containing microcapsules in ethylene vinyl acetate (EVA) copolymer carrier), as well as MICROSPHERE™ products available from Matsumoto Yushi-Seiyaku Co., Ltd. (e.g., Matsumoto's MICROSPHERE™ F and FN series products, and/or masterbatches thereof, such as MBFN-190SSPE, containing 50 wt % microspheres in 50 wt % carrier resin comprising polyethylene/methyl-methacrylate copolymer).

A polymer shell is any shell-like structure made from a polymer. It can be hollow, filled, or partially filled, such as with a propellant. The propellant can be any liquid having a boiling temperature not higher than the softening temperature of the thermoplastic polymer shell. Expansion of the thermoplastic microspheres is typically physical by nature. It is believed that as the propellant is heated up, the propellant expands, increasing the intrinsic pressure; at the same time the shell softens, thus causing the microspheres' expansion, normally from about 2 to about 8 times their diameter, or about 30 to about 80 times volume, and the thickness of polymer shell may decrease to 0.1 µm or even thinner. Factors that may affect the expandability of the microspheres include volatility of the encapsulated propellant, gas permeability, and viscoelasticity of the polymer shell.

Various monomers are suitable for preparation of the polymer shell and may comprise acrylonitrile, methacrylonitrile, α-haloacrylonitrile, α-ethoxyacrylonitrile, fumarc nitrile, acrylic esters or any combinations thereof. In some particular embodiments, the monomer is made from polyacrylonitrile. The polymer shell may have a softening temperature, i.e., the glass transition temperature (Tg) ranging from about 80° C. to about 200° C.

The liquids suitable for preparation of the propellant of the thermo-expandable microsphere usually have a boiling point lower than the softening temperature of the polymer shell at atmosphere pressure. Suitable liquids include, but are not limited to, hydrocarbon liquids (such as isobutane, 2,4-dimethylbutane, 2-methylpentane, 3-methylpentane, n-hexane, cyclohexane, heptane, isooctane, or any combinations thereof).

When a thermo-expandable microsphere is heated up, it starts to expand at a certain temperature. The temperature at which the expansion starts is called the initiation temperature, or $T_{inititation}$, while the temperature at which the maximum expansion is reached is called $T_{max}$. The $T_{initiation}$ and $T_{max}$ can be measured by thermo-mechanical analysis (TMA) of thermo expansion property. Suitable thermo-expandable microspheres may have a $T_{inititation}$ of at least about 100° C., preferably at least about 110° C. or 120° C., more preferably at least 130° C., or even at least 140° C., and a $T_{max}$ of less than 300° C., such as less than any one of 260° C., 240° C., 220° C., or 210° C.

Thermo-expandable microspheres suitable for foamed TPV compositions of some embodiments may have various pre-expansion average particle sizes. In some embodiments, the average particle size may range from about 1 μm to about 500 μm, preferably from about 2 μm to about 300 μm, such as from about 4 μm to about 100 μm, 5 to 50 μm, or 10 to 45 μm, with ranges from any of the foregoing low ends to any of the foregoing high ends also contemplated in various embodiments. The average particle size of the expandable microsphere, after expansion, is preferably not less than about 50 μm, preferably no less than about 80 μm, more preferably no less than about 100 μm, and most preferably not less than about 120 μm.

Thermo-expandable microspheres can be produced by any suitable method. For instance, suitable production methods may include a step of polymerizing the monomers in an aqueous suspension in the presence of a propellant, and are known as described in, e.g., U.S. Pat. No. 3,615,972, WIPO Publication Nos. WO 99/46320, and WO 99/43758, the contents of which are hereby incorporated by reference.

Due to the small size of the microspheres, it may be preferable to utilize the microspheres in masterbatch form. The carrier polymer for the masterbatch is preferably a thermoplastic resin or propylene-based elastomer. For instance, suitable carrier resins may include polyethylene, polypropylene, ethylene/methyl-methacrylate copolymers, propylene-based elastomers, propylene-ethylene or other propylene-α-olefin copolymers (including impact copolymers and random copolymers), ethylene vinyl acetate (EVA), and other thermoplastic resins suitable for making masterbatches of small particulate matter.

Further, although the microspheres may be blended with a TPV composition with the aid of compatibilizers (e.g., graft copolymers), as described in WO 2013/062685, in some embodiments of the present invention, it is preferred that the TPV composition be foamed with microspheres without the use of a compatibilizer (e.g., graft copolymers), as this avoids needless complication of the formulation, while still achieving excellent results in the foamed composition.

Thermo-expandable microspheres may provide particular advantages in forming foamed TPV compositions in accordance with some embodiments. Thermo-expandable microspheres do not behave like conventional chemical foaming agents when creating low-density TPV materials using such microspheres. In particular, a gas bubble is not formed (as is the case with typical chemical foaming). Instead, each thermo-expandable microsphere behaves somewhat akin to popcorn: in the unheated state, these materials are dense solids (e.g., specific gravity about 0.85 g/cc), but upon exposure to sufficient heat (precise temperature depending upon the type of microsphere and/or microsphere masterbatch used), the microsphere pops, forming a small, very low-density spherical particle of about 0.02 g/cc specific gravity. In this way, microsphere technology is more akin to forming a physical blend of high and low density components, than a conventional foam. Furthermore, the thus-described formation of low-density spherical particles creates an advantageous network of closed low-density cells that are isolated and further that do not create openings extending from the surface into the interior of the article, leading to superior sealing against air/water ingress and the like. Thus, although the shorthand "foam" and "foaming" may be used in the present application, when applied to such "popped" thermo-expandable microspheres (e.g., those having been exposed to sufficient heat to convert the microspheres to their low-density state), such terms could just as well be taken to mean a physical blend of high-density and low-density particles.

Nonetheless, alternative foaming agents are still contemplated as potentially suitable in yet further embodiments. For instance, any chemical foaming agent may be suitable for practice of various embodiments of the present invention. Such chemical foaming agents decompose at elevated temperatures to form gases or vapors to blow the polymer into foam form. These agents allow reduction in cost of raw materials. The agent preferably takes a solid form, so it is conveniently dry-blended with the polymer material.

Chemical foaming agents include, but are not limited to, organic foaming agents, such as 4,4'-oxybis benzene sulfonyl hydrazide; azodicarbonamide; azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic foaming agents such as ammonium bicarbonate and sodium bicarbonate. Specifically, the foaming agent can be azodicarbonamide. A gas, such as air, nitrogen, carbon dioxide, etc., may also be injected into the composition during the injection molding process. Examples of such alternative foaming agents can include those commercially available under the trade names HYDROCERAL® (Clariant International Ltd.), CELOGEN™ (Chemtura Corporation, Philadelphia, Pa., USA), GENITRON™, POROFOR™, FICEL™ (Lanxess AG, Germany), SUVA™, DYMEL™, FORMACEL™, ZYRON™ (DuPont Chemical Company, Wilmington, Del., USA), and PLANAGEN™ (INBRA S.A., Brazil).

Making Foamed Compositions with Thermo-Expandable Microspheres

Regardless of how the foaming agent is introduced to, blended with, or otherwise combined with the foamable TPV composition, methods of some embodiments include: (i) combining 85 to 99.9 parts by weight (such as 88, 90, 95 or 96.5 parts by weight to 99 or 99.5 parts by weight) foamable TPV composition with 0.1-10 parts by weight (such as 0.5 or 1 parts by weight to 4.5 or 5 parts by weight) foaming agent, and (ii) forming a foamed TPV composition therefrom. The parts by weight foaming agent are of the agent itself, regardless of whether it is dispersed within a carrier resin as a masterbatch (e.g., a combination of 90 parts by weight TPV composition with 10 parts by weight of a 50% foaming agent masterbatch should be regarded as combination of 90 parts by weight TPV composition with 5 parts by weight foaming agent; 88 parts by weight TPV composition with 12 parts by weight of a 50% foaming agent masterbatch is regarded as a combination of 88 parts by weight TPV composition and 6 parts by weight foaming agent; etc.). As noted, the foaming agent preferably comprises or consists of thermo-expandable microspheres; and relative amounts of foamable TPV composition and foaming agent may be within any range from any of the just-noted low ends to any of the just-noted high ends. Further additives may optionally be included in the combining step above, (i) for instance, such further additives may include any additive(s) noted above for inclusion in a TPV formulation (with the caveat just noted regarding foaming agents, per some embodiments).

As previously detailed, the foamable TPV compositions of some embodiments (in which the optional high melt-strength thermoplastic resin is employed) may be made by combining 100 parts TPV composition and/or TPV formulation with 20 to 220 parts by weight high-melt strength thermoplastic resin (such as 30 to 200, 50 to 175, 75 to 125 parts by weight high melt-strength thermoplastic resin, and/or any other ranges previously described for parts by weight of the high melt-strength resin to be combined with TPV). Such previously-described combinations can readily be used to determine wt % of the (i) TPV combined with (ii) the high melt-strength thermoplastic resin to form the foamable TPV composition that is, in turn, combined at 90 to 99.9 parts by weight with the foaming agent. Such relative wt % of TPV and high melt-strength thermoplastic resin can readily be used to determine relative amounts of (i) TPV, (ii) high melt-strength thermoplastic resin, and (iii) foaming agent, on a parts-by-weight basis, suitable for combination to make foamed compositions according to various embodiments. For example, where the foamable TPV composition is made by combining 20 to 220 parts by weight high melt-strength thermoplastic resin with 100 parts by weight TPV, one can deduce the foamable TPV composition comprises about 23.1 to about 66.7 wt % high melt-strength thermoplastic resin, with the balance being TPV. Thus, 90 parts by weight TPV may alternatively be understood, in such embodiments, as (i) 20.8 to 60 parts by weight high melt-strength thermoplastic resin and (ii) 30 to 69.2 parts by weight TPV composition and/or TPV formulation. These are in turn combined with (iii) 0.1 to 10 parts by weight of foaming agent. Likewise, where 99.9 parts by weight TPV are utilized, this may instead be expressed as (i) 23.1 to 66.6 parts by weight high melt-strength thermoplastic resin and (ii) 76.85 to 33.3 parts by weight TPV composition and/or TPV formulation. The 90 to 99.9 parts by weight foamable TPV composition may readily be converted in a similar manner to parts by weight of (i) high melt-strength thermoplastic resin and (ii) TPV formulation and/or composition for any of the other previously-described suitable ranges of relative amounts of (i) and (ii). Put more generally, some embodiments may comprise a combination of (i) 20.8 to 66.6 parts by weight high melt-strength thermoplastic resin, (ii) 30 to 76.85 parts by weight TPV composition and/or TPV formulation, and (iii) 0.1 to 10 parts by weight foaming agent, with sub-ranges of (i) and (ii) in accordance with previous descriptions of combinations of those two components.

In general, the lower the specific gravity desired in the foamed composition (or, in other words, the greater the desired foaming ratio, defined as pre-foamed composition specific gravity divided by foamed composition specific gravity), the greater the amount of foaming agent to combine with the foamable TPV composition. According to certain embodiments employing thermo-expandable microspheres as a foaming agent, however, the foaming ratio (and hence specific gravity of the foamed composition) can also or instead be controlled based at least in part upon the temperature at which the combining (i) takes place, such that higher temperatures may result in greater expansion of the microspheres.

Where the foamable TPV composition comprises non-vulcanized rubber, the combining (i) preferably also vulcanizes at least a portion, preferably most, and most preferably all of the rubber of the foamable composition, providing a foamed TPV composition having an at least partially vulcanized, preferably a fully vulcanized, rubber component. This may be accomplished, e.g., by coextrusion in the presence of cross-linking agent at temperatures high enough to initiate a cross-linking reaction (which the ordinarily skilled artisan will recognize may vary depending on the identity of the cross-linking agent and/or cure activators or accelerators).

Otherwise, forming the foamed TPV composition may include the use of any discrete molding or continuous extrusion means for forming and shaping polyolefins known in the art. Some of these means may advantageously also serve the function of combining the TPV composition and foaming agent (and any optional further additives). For instance, coextrusion of TPV composition and foaming agent may be used both (i) to combine these components and (ii) to form the foamed TPV composition. Alternatively, however, the components may be combined beforehand, e.g., in a blender, melt-mixer, or the like, and then fed to an extruder or other like apparatus for forming the foamed composition.

Examples of suitable molding or continuous extrusion means include: sheet extrusion, profile extrusion or co-extrusion, compression molding, injection molding, co-injection molding, gas-assisted injection molding, transfer molding, foam molding, transfer molding, vacuum forming, lamination, calendering, or other forms of processing such as described in, for example, "Rubber Technology," by Maurice Norton (Van Nostrand Reinhold—New York), or combinations thereof. Among these, extrusion including co-extrusion is particularly suitable for forming the foamed material of various embodiments of the present invention.

As noted, methods according to some embodiments may include controlling the melt temperature in the combining (i). For instance, the combining (i) may take place at melt temperatures within the range from 195° C. to 210° C., such as from a low of any one of 195, 197, 200, 202, 203, 204, 205, 206, and 207° C. to a high of any one of 200, 201, 202, 203, 204, 205, 206, 207, 208, 209, and 210° C., provided the high end of the range is greater than the low end. In particular embodiments, the combining (i) may take place by coextrusion of the foamable TPV composition and the foaming agent in an extruder equipped with a die through which the blended composition exits the extruder (e.g., as pellets, as a sheet, or as an extrusion-molded article when the die constitutes a molding pattern). In such embodiments, the melt temperature may be considered as the temperature of the molten material in the extruder as measured just before the material passes into the die. On the other hand, in embodiments in which the combining (i) takes place by, e.g., melt-mixing, the temperature as measured in the molten blend may be taken as the melt temperature of the combining (i).

Foamed TPV compositions of various embodiments may have specific gravity less than 0.55 g/cc, such as within the range from 0.2 to 0.5 g/cc, or 0.3 to 0.5 g/cc, or 0.35 to less than 0.5 g/cc, such as from 0.38, 0.39, or 0.42 g/cc to 0.43, 0.44, or 0.45, 0.46, 0.47, or 0.48 g/cc, with ranges from any of the foregoing lows to any of the foregoing highs also contemplated in various embodiments (e.g., 0.35 g/cc to 0.44 g/cc). Unless otherwise noted, specific gravity may be determined in accordance with ASTM D792.

The foamed TPV composition's physical properties, and in particular its tensile properties, will vary depending upon the specific gravity to which the TPV is foamed. However, foamed TPV compositions according to some embodiments, and/or articles made from or comprising foamed TPV compositions, when foamed to specific gravity within the range from 0.39 to 0.48 g/cc, may exhibit one or more (preferably two or more, such as three or more, four or more, five or more, six or more, or even all) of the following properties:

25% tensile modulus (ISO 37 at 23° C. at 50 mm/min using an Instron testing machine with a variation of specimen thickness because the specimen is foamed) within the range from 1, 2, 3, 4, or 7 MPa to 4, 5, 6, 7, 8, 9, 10, 12, or 15 MPa, provided the high end of the range is greater than the low end (e.g., from 1 to 6 MPa, 4 to 10 MPa, 3 to 6 MPa, etc.). Tensile modulus indicates the amount of force required to deform the foamed composition (and/or an article made therefrom), and thus is a measure of stiffness. Foamed articles are desirably somewhat, but not overly, flexible— hence a balanced value in tensile modulus is desired;

Hardness (measured per TPE0189, with 15 sec delay with a variation of specimen thickness because the specimen is foamed) within the range from a low of 60, 65, 67, or 70 (Shore A) to a high of 75, 77, 80, 83, 85, or 90.

Extrusion Surface Roughness (ESR), also referred to as "surface roughness," of less than 8.0 microns (μm), preferably less than 7.5, 7.0, 6.5, 6.0, or 5.8 microns;

Elongation at break (also measured per ISO 37 at 23° C. at 50 mm/min using an Instron testing machine with a variation of specimen thickness because the specimen is foamed) within the range from 80% or 95% to 115% or 130%;

Ultimate tensile strength (UTS), or tensile strength at break (measured per ISO 37 at 23° C. at 50 mm/min using an Instron testing machine with a variation of specimen thickness because the specimen is foamed), of at least 30, 40, 50, 55, 60, or 65 MPa. UTS indicates the tensile strength of a sample upon breakage after being stretched at a specified rate until breakage; and M100 and UTS for foamed compositions are both measured on extruded tapes (e.g., tapes formed by coextruding TPV composition with foaming agent); such measurement is carried out according to the procedures of ISO 37 (Die C) at 23° C. at 50 mm/min using an Instron testing machine with a variation of specimen thickness because the specimen is foamed. Also, where an ISO, ASTM or other test requires one to choose a particular die-shaped article for testing, it should be assumed that Die C is used unless otherwise specified.

Extrusion surface roughness ("ESR") is reported as an arithmetic average of surface irregularity (Ra) in microns (or micro-inches, where indicated). Surface irregularity may be measured directly on an extruded article. Otherwise, the following procedure may be used to determine the ESR value of a TPV composition: approximately 8 kg (16 lbs.) of the TPV to be tested is fed into a 45 mm diameter extruder equipped with a 30:1 L/D screw with high shear screw element. The extruder should be fitted with a strip die of 2 mm thickness. A breaker plate is used with the die, but no screen pack placed in front of the breaker plate. Temperature profiles of the extruder should be set in accordance with the melt temperature design for making the extruded article. If not otherwise specified, however, set extruder temperature as follows: Zone 1=180° C. (feed zone); Zone 2=190° C. (feed zone); Zone 3=200° C. (feed zone); Zone 4=205° C. (die zone). When the zone temperatures are reached, the screw is activated. Screw RPM is set to 30 to 60. For the first 5 minutes of extrusion the extruder should be flushed and the extruded material discarded. Water bath with room temperature (20 to 25° C.) water is used to cool the extruded profile not discarded. Representative samples are collected afterwards. ESR is then measured on the samples using a model Mitutoyo SJ-500P with micrometer test conditions based on ISO 1997/JIS 1982 comprising 5 measurements of 0.8 mm length at a speed of 0.5 mm/seconds. The test was conducted three times per sample. The reported Ra value was an average of the three runs.

Alternatively, where ESR of a foamed article is reported, then the extruded article is subjected directly to the referenced ESR measurement using the Surfanalyzer system.

Glass Run Channels and Other Applications for Foamed TPV Compositions

Foamed TPV compositions in accordance with various embodiments may be suitable for forming any number of articles. Some non-limiting examples include automotive and industrial components such as weatherseals, glass run channels (all or any portion thereof, such as foot or base portions of such glass run channels), automotive boots and bellows (e.g., for steering and suspension), tubing, seals, gaskets, splines, air induction system ducts, consumer electronics (e.g., cabling or coating for wires), grips, and the like. Such compositions may be particularly suitable for applications in which low weight molded elastomeric polymer components are desired.

For instance, certain embodiments provide a glass run channel, such as that shown in FIG. 1, having (a) a base portion 105, (b) two side wall portions 110 extending outward from the base portion 105, at angles 111 and 112 so as to define a generally "U" shape cross-section of the article, as shown in FIG. 1. The glass run channel further comprises two sealing lip portions 120 extending from ends of the side wall portions 110 into the "U" defined by the base portion 105 and side wall portions 110, such that the sealing lip portions 120 project toward the base portion 105 and are capable of slidably engaging a glass pane sliding through the "U" defined by the base 105 and side wall 110 portions into and/or out of the plane at which the cross-section is taken. Glass run channels according to some embodiments may further include additional features, such as the holding lips 125 protruding outward from the side wall portions 110 as shown in FIG. 1.

Any portion or all of the surfaces of the base portion 105 and/or sealing lip portions 120 that contact the sliding glass may optionally be coated (e.g., with a low-friction coating sometimes referred to as a "slip coat"). As shown in FIG. 1, each such surface has a low-friction coating 130. Furthermore, interior sidewalls of either or both side portions 110 may be coated with a low-friction coating, e.g., in the event that the article is shaped such that glass might slide along such surface. As shown in FIG. 1, one side portion 110 has such a coating 133 on its inner surface (that is, the surface facing the interior of the "U" shape defined by the base 105 and side wall 110 portions).

Glass run channels according to some embodiments include a foamed TPV composition in accordance with the above descriptions. As shown in FIG. 1, only the base portion 105 is made from the foamed TPV composition. The side wall portions 110 and lip portions 120 are made from non-foamed TPV material. According to yet other embodiments, the side wall portions 110 and/or the sealing lip portions 120 may be made from any non-foamed elastomeric material, including TPVs, thermoplastic elastomers, natural rubbers, synthetic rubbers (e.g., EPDM rubbers, EP rubbers, butyl rubbers, and the like).

According to yet other embodiments, the base portion 105 and either or both side wall portions 110 may be formed from a foamed TPV composition (preferably from the same foamed TPV composition). In such embodiments, the sealing lip portions 120 are preferably still non-foamed, in accordance with the sealing lip portions 120 shown in FIG. 1. Even in embodiments in which one or both side wall portions 110 are foamed, one or both of the side wall portions 110 may include a low-friction coating 133, e.g., on a surface of the side wall portion facing the internal portion of the "U" shape defined by the base 105 and side walls 110.

Optionally, reinforcing solid (non-foamed) coatings may be employed on any portion of any surface of the base portion 105 or side wall portions 110, e.g., to guard against tear or abrasion of the foamed material making up the base portion 105 and/or side wall portion(s) 110. And, in yet further embodiments, even the sealing lip portions 120 and/or holding lips 125 may be made of foamed TPV in accordance with various embodiments previously described. Preferably, in such embodiments, the foamed sealing lip portions 120 will include a non-foamed coating (e.g., a non-foamed TPV surface coating). Optionally, the holding lips 125 may also include such a non-foamed coating, although suitable performance may be obtained even if the holding lips 125 have no such coating.

EXAMPLES

In order to provide a better understanding of the foregoing discussion, the following non-limiting examples are offered. Although the examples may be directed to specific embodiments, they are not to be viewed as limiting the invention in any specific respect.

Example 1

Two TPV compositions were prepared by dynamic vulcanization in a twin screw extruder with ingredients as indicated in Table 1.1.

TABLE 1.1

Example 1 TPVs

| | Rubber (wt %) | PP (wt %) | Oil (wt %) | Curatives (wt %) | Carbon Black MB (wt %) | Clay (wt %) |
|---|---|---|---|---|---|---|
| TPV-1 | 55 | 19 | 10 | 1 | 2 | 13 |
| TPV-2* | 40 | 32 | 11 | 3.5 | 3.7 | 9.5 |

*Total wt % of 99.7 due to rounding in significant figure reporting

The "Rubber" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company, Houston, Tex. The reported wt % s in Table 1 are of the oil-extended rubber, that is, they include both the rubber and the extension oil.

The "PP" was an ExxonMobil™ PP5341 polypropylene, which is a polypropylene homopolymer with a density of 0.9 g/cc and a MFR of 0.83 g/10 min (ASTM D1238; 230° C. and 2.16 kg weight). PP5341 is commercially available from ExxonMobil Chemical Company, Houston, Tex.

"Oil" was Sunpar 150 M paraffinic oil available from HollyFrontier Refining & Marketing LLC.

"Curatives" were a blend of (i) phenolic resin-in-oil curative that contained 30 wt % phenolic resin and 70 wt % oil with (ii) zinc oxide and (iii) stannous chloride curing aids.

"CB MB" was a carbon black masterbatch that contained about 40 wt % carbon black in polypropylene.

"Clay" was Icecap™ K Clay.

Foamable TPV compositions were formed from the above TPVs by twin screw compounding the TPV with a high melt-strength polypropylene in the parts by weight shown in Table 1.2 below. The die temperature of the extruder was 235° C., the adaptor was at 200° C., and the second adaptor was at 190° C. The twin screw extruder used in the examples of the invention had 10 blocks have a temperature at block 1 of 180° C., block 2 at 165° C., block 3 at 170° C., block 4 at 160° C., block 5 at 155° C., block 6 at 170° C., block 7 at 180° C., block 8 at 200° C., block 9 at 180° C., and block 10 at 150° C.

TABLE 1.2

Example 1 Foamable TPV Compositions

| | Sample 1 | Sample 2 | Sample 3 | Sample 4 | Sample 5 | Sample 6 |
|---|---|---|---|---|---|---|
| TPV-1 | 100 | 100 | 100 | 100 | 100 | 0 |
| TPV-2 | 0 | 0 | 0 | 0 | 0 | 100 |

TABLE 1.2-continued

Example 1 Foamable TPV Compositions

|          | Sample 1 | Sample 2 | Sample 3 | Sample 4 | Sample 5 | Sample 6 |
|----------|----------|----------|----------|----------|----------|----------|
| HMS PP-1 | 0        | 0        | 30       | 0        | 0        | 0        |
| HMS PP-2 | 0        | 30       | 0        | 100      | 200      | 50       |
| Total:   | 100      | 130      | 130      | 200      | 300      | 150      |

* Values in Table 1.2 are in parts by weight

The high melt-strength homopolypropylene HMS PP-1 had the following properties: MFR of 2.78 g/10 min (ASTM D-1238, 230° C., 2.16 kg); Melt strength of 36 cN; Mw (GPC-3D with light-scattering detector) of 473,818 g/mol; Mn (GPC-3D with light-scattering detector) of 30,031 g/mol; MWD (Mw_LS/Mn_LS) of 15.8; Mw (GPC-4D with IR) of 452,864 g/mol; Mn (GPC-4D with IR) of 31,583 g/mol; MWD (Mw_IR/Mn_IR) of 14.3; Flex modulus (1% secant) of 1,920 MPa per ASTM D790A using a crosshead speed of 1.26 mm/min; Tensile strength at yield of 39.7 MPa per ASTM D638; Notched Izod Impact Strength of 0.918 ft-lb/in per ASTM D256 at 23° C.

The high melt-strength homopolypropylene HMS PP-2 had the following properties: MFR of 1.89 g/10 min (ASTM D-1238, 230° C., 2.16 kg); Mw (GPC-3D with light scattering detector) of 455,453 g/mol; Mn (GPC-3D with light scattering detector) of 30,097 g/mol; MWD (Mw_LS/Mn_LS) of 15.1; Mw (GPC-4D with IR) of 478,781 g/mol; Mn (GPC-4D with IR) of 34,792 g/mol; MWD (Mw_IR/Mn_IR) of 13.8; Flex modulus (1% secant) of 1,680 MPa per ASTM D790A using a crosshead speed of 1.26 mm/min; Tensile strength at yield of 36.2 MPa per ASTM D637; Notched Izod Impact Strength of 0.870 ft-lb/in per ASTM D256 at 23° C.

Each foamable TPV composition Sample 1-6 of Table 1.2 was formed into four or five foamed articles of differing specific gravity by means of coextrusion of 93 wt % of the TPV composition in a twin-screw extruder (at 60 RPM screw speed) with 7 wt % of a masterbatch of thermo-expandable microspheres, forming 26 samples (F1-F26) of extruded foam sheets. Different melt temperatures were used to target different specific gravities in the foam; melt temps and die temps are reported for each sample in Table 1.3 below, along with various properties of the foamed sheets F1-F26.

The masterbatch of thermo-expandable microspheres was MBFN-190SSPE, a commercial masterbatch comprising 50 wt % microspheres in 50 wt % ethylene/methyl-methacrylate copolymer carrier resin, available from Matsumoto Yushi-Seiyaku Co., Ltd. (Japan), meaning that 3.5 wt % of thermo-expandable microspheres were actually used in making the foamed articles. The masterbatch includes the thermo-expandable microspheres (having an AN-copolymer shell) with average particle size 10-16 μm distributed in pellets of the carrier resin. The expansion initiation temperature $T_I$ of the microspheres is 160-170° C.; the maximum expansion temperature $T_{max}$ is 210-220° C.

TABLE 1.3

Example 1 Foamed Sheets

| No. | Formed From | Die T (° C.) | Melt T (° C.) | Density (g/cc) | Hardness (Shore A) | 25% Tensile Mod (MPa) | Elongation at Break (%) | Surface Roughness (Ra, μm) |
|-----|-------------|--------------|---------------|----------------|--------------------|-----------------------|------------------------|----------------------------|
| F1  | Sample 1    | 200          | 208           | 0.4293         | 63                 | 1.95                  | 156                    | 7.2                        |
| F2  | Sample 1    | 190          | 204           | 0.4698         | 56                 | 2.2                   | 184                    | 5.6                        |
| F3  | Sample 1    | 180          | 194           | 0.5137         | 69                 | 2.43                  | 200                    | 4.3                        |
| F4  | Sample 1    | 175          | 187           | 0.5936         | 74                 | 2.93                  | 243                    | 3.3                        |
| F5  | Sample 1    | 175          | 208           | 0.4256         | 62                 | 1.88                  | 134                    | 7.3                        |
| F6  | Sample 2    | 200          | 209           | 0.4312         | 74                 | 2.78                  | 107                    | 6.7                        |
| F7  | Sample 2    | 190          | 205           | 0.4652         | 76                 | 3.15                  | 120                    | 5.5                        |
| F8  | Sample 2    | 180          | 196           | 0.5074         | 81                 | 3.78                  | 149                    | 5.1                        |
| F9  | Sample 2    | 175          | 190           | 0.5617         | 83                 | 4.37                  | 157                    | 3.7                        |
| F10 | Sample 2    | 175          | 208           | 0.4452         | 69                 | 2.83                  | 105                    | 5.3                        |
| F11 | Sample 3    | 200          | 207           | 0.4524         | 75                 | 3.04                  | 104                    | 7                          |
| F12 | Sample 3    | 190          | 203           | 0.4799         | 77                 | 3.38                  | 116                    | 5.5                        |
| F13 | Sample 3    | 180          | 194           | 0.5801         | 84                 | 4.32                  | 167                    | 4.4                        |
| F14 | Sample 3    | 175          | 207           | 0.4526         | 70                 | 2.92                  | 101                    | 6.7                        |
| F15 | Sample 4    | 200          | 209           | 0.4351         | 84                 | 4.25                  | 106                    | 7.2                        |
| F16 | Sample 4    | 190          | 205           | 0.4499         | 71                 | 4.41                  | 106                    | 6.9                        |
| F17 | Sample 4    | 180          | 197           | 0.4856         | 69                 | 5.15                  | 100                    | 5.5                        |
| F18 | Sample 4    | 175          | 209           | 0.4060         | 70                 | 3.38                  | 64                     | 6.8                        |
| F19 | Sample 5    | 200          | 210           | 0.4211         | 79                 | 4.73                  | 82                     | 6.4                        |
| F20 | Sample 5    | 190          | 206           | 0.4351         | 79                 | 5.19                  | 88                     | 6.2                        |
| F21 | Sample 5    | 180          | 198           | 0.5085         | 78                 | 5.84                  | 75                     | 6.6                        |
| F22 | Sample 5    | 175          | 210           | 0.3939         | 71                 | 4.03                  | 52                     | 6.2                        |
| F23 | Sample 6    | 200          | 208           | 0.4442         | 63                 | 2.7                   | 100                    | 5.6                        |
| F24 | Sample 6    | 190          | 203           | 0.4801         | 63                 | 3.12                  | 128                    | 5.1                        |
| F25 | Sample 6    | 180          | 195           | 0.5399         | 67                 | 3.49                  | 133                    | 4.6                        |
| F26 | Sample 6    | 175          | 207           | 0.4300         | 64                 | 2.43                  | 86                     | 5.4                        |

Surprisingly, good surface roughness was obtained even at low specific gravities; all samples with specific gravity less than 0.5 g/cc maintained less than 8 μm Ra surface roughness. Interestingly, the sample materials made from Samples 2 and Samples 6 provided particularly good results, having the lowest surface roughness values on average. This suggests that a moderate, but not too high, amount of additional polypropylene blended with TPV to make a foamable TPV composition (e.g., around 40 to 50 wt % total PP, between the PP in the TPV and the additional PP) may provide particularly beneficial surface roughness properties in the foamed composition.

Figure 2:
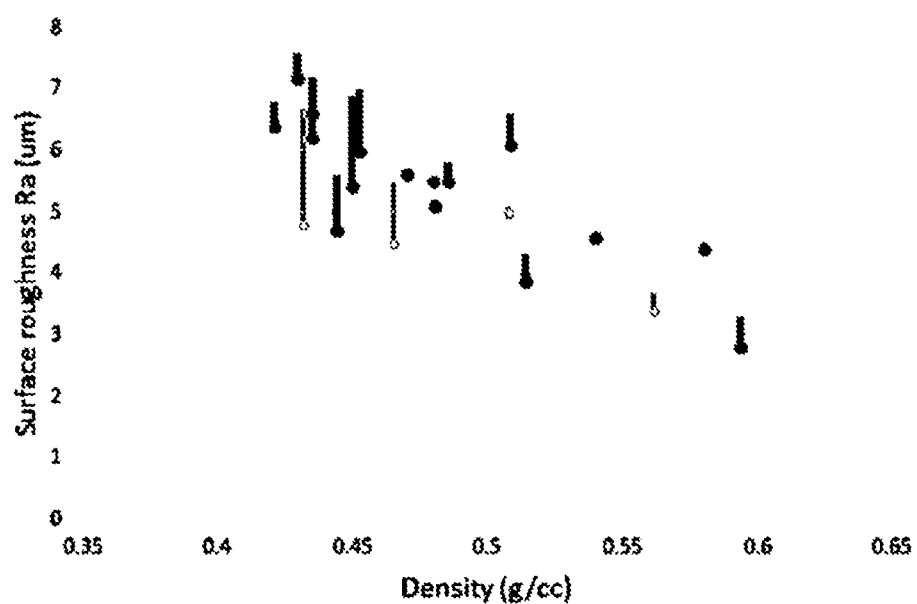
FIG. 2 is a graph showing surface roughness vs. density (specific gravity) for foamed TPV articles in connection with Example 1.

FIG. 2 illustrates the approximate relationship between density and surface roughness. In particular, each foamed extruded sample is plotted by its density (specific gravity, g/cc) vs. its surface roughness Ra (μm). As FIG. 2 illustrates, surface roughness (both top surface roughness and bottom surface roughness) in general increases with decreasing density. The bars on FIG. 2 show the difference between the top and bottom surface. However, all samples advantageously maintained surface roughness below 8 μm, even when approaching 0.4 g/cc specific gravity. FIG. 2 also illustrates an interest effect in the range of specific gravity from approximately 0.46 to 0.49 g/cc, in which decreasing specific gravity did not significantly increase surface roughness.

Figure 3:
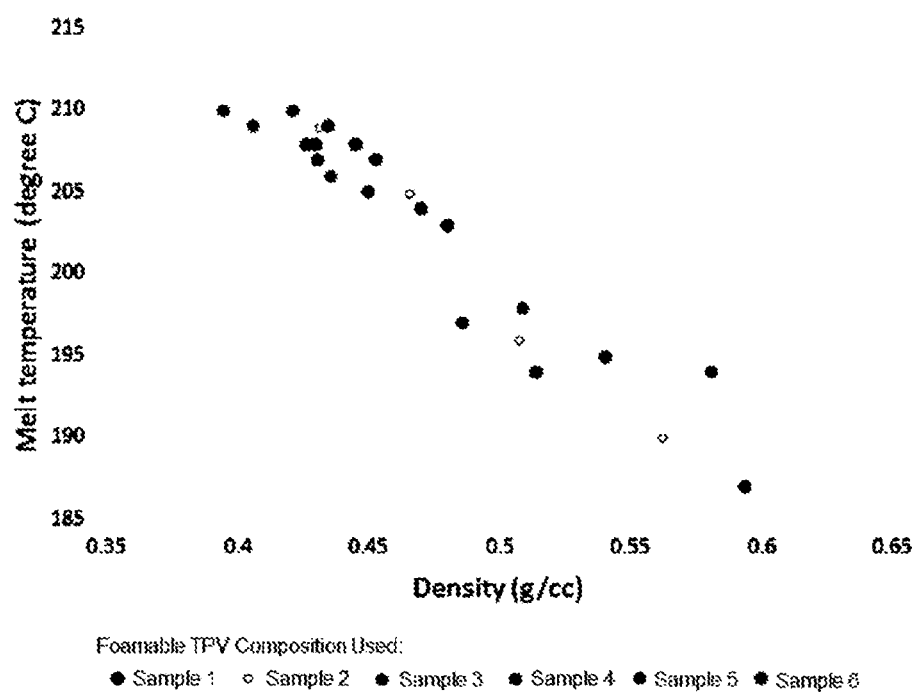
FIG. 3 is a graph showing melt temperature vs. density (specific gravity) for foamed TPV articles in connection with Example 1.

FIG. 3 illustrates the relationship between melt temperature and specific gravity, indicating that melt temperature is one convenient mechanism to use to achieve a desired specific gravity in the foamed material made from foamable TPV compositions and thermo-expandable microspheres. In general, there is a strong trend showing that higher melt temperature leads to lower density (e.g., greater expansion of the thermo-expandable microspheres).

Figure 4:
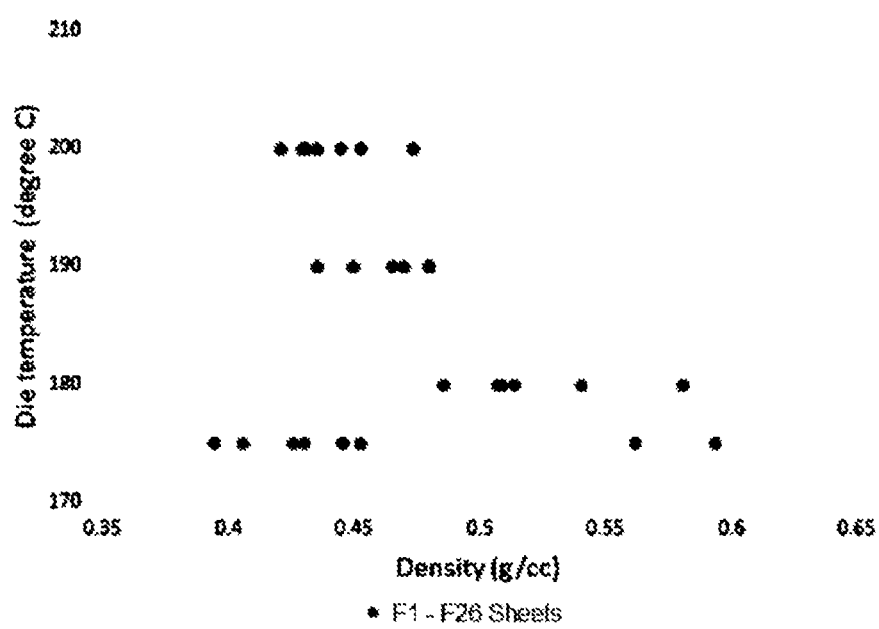
FIG. 4 is a graph showing die temperature vs. density (specific gravity) for foamed TPV articles in connection with Example 1.

FIG. 4 illustrates that die temperature, on the other hand, may not be a suitable means of controlling specific gravity. Unlike with FIG. 3 (illustrating a clear relationship between melt temperature and specific gravity), FIG. 4 shows no clear trend between die temperature and specific gravity.

Example 2

Another sample TPV (TPV-3) was made by dynamic vulcanization in a twin-screw extruder, with the following ingredients:

TABLE 2.1

Example 2 TPV composition

| | Rubber (wt %) | PP (wt %) | Oil (wt %) | Curatives (wt %) | Carbon Black MB (wt %) | Clay (wt %) |
|---|---|---|---|---|---|---|
| TPV-3 | 32 | 43 | 10 | 3 | 4 | 8 |

Each component in Table 2.1 is as described in connection with Table 1.1 of Example 1.

The TPV composition TPV-3 was coextruded with MBFN-190SSPE thermo-expandable microsphere masterbatch (the same product used for Example 1) at a 91/9 weight ratio (TPV to microspheres masterbatch) into a portion of a glass-run-channel profile GRC-6. In addition, the Sample 2 and Sample 6 foamable TPV compositions from Example 1 were also formed into GRC profiles (GRC-1 to GRC-5) by coextrusion with MBFN-190SSPE, as reported in Table 2.2 below. As set forth in Table 1.1, Sample 2 was made by combining 100 parts TPV-1 with 30 parts HMS PP-2; and Sample 6 was made by combining 100 parts TPV-2 with 50 parts HMS PP-2. Density of the foamed portion of each GRC profile is also reported in Table 2.2.

The base and both side-walls of each GRC profile were made with the coextruded foamed material; the sealing lips and holding lips were formed using non-foamed Santoprene™ 101-73W715 TPV, commercially available from ExxonMobil Chemical Company (Houston, Tex., USA). In addition, a low-friction TPV (Santoprene™ 123-52W242 TPV, also from ExxonMobil Chemical Company) was included as a slip-coat layer on the surfaces of the sealing lips and the foamed base that are intended to slidably contact a glass pane (akin to the slip coat layers 130 of the embodiment illustrated in FIG. 1). The slip coat extruder setting was 170° C.-180° C.-190° C. (3 zones)-200° C. (connector), melt temperature around 203° C. The lip material extruder setting was 170° C.-180° C.-190° C.-200° C. (4 zones), 195° C. (connector), melt temperature around 205° C. The foamed foot material extruder setting was 155° C.-165° C.-200° C.-210° C. (4 zones), 205° C. (connector), 205° C. (die zone 1), 200° C. (die zone 2), melt temperature around 211° C.

TABLE 2.2

Example 2 GRC Articles

| GRC | Foamable TPV Used | MBFN-190SSPE (wt %) | Density (g/cm³) |
|---|---|---|---|
| GRC-1 | Sample 2 | 7 | 0.59 |
| GRC-2 | Sample 2 | 8 | 0.49 |
| GRC-3 | Sample 2 | 9 | 0.45 |
| GRC-4 | Sample 6 | 9 | 0.46 |
| GRC-5 | Sample 6 | 10 | 0.45 |
| GRC-6 | TPV-3 | 9 | 0.50 |

Acceptably low densities of the foamed base and side-walls portions were achievable in all cases, although GRC-2, GRC-3, GRC-4, and GRC-5 advantageously had foamed portions with densities under 0.5 g/cc. For the foot portion of the GRC, the main function is to provide enough support for the seal slip and fill the gap of sash, and therefore as long as the TPV material has good stiffness, indicated by 25% tensile modulus, the foamed GRC foot is likely to work with a better fuel efficiency.

Example 3

Foamable TPV compositions were formed by compounding the following ingredients in a twin-screw extruder.

Santoprene™ 101-87 is a thermoplastic vulcanizate commercially available from ExxonMobil Chemical Co. having a density of 0.95 g/cc per ASTM D792, a Shore A Hardness at 15 seconds and 23° C. per ISO 868 of 94, a compression set Type 1 per ASTM D395B of 37% at 70° C., 22 hr Type A and 52% at 125° C., 70 hr Type A. Santoprene™ 103-40 is a thermoplastic vulcanizate commercially available from ExxonMobil Chemical Co. having a density of 0.95 g/cc per ASTM D792, a Shore D Hardness at 15 seconds and 23° C. per ISO 868 of 41, a compression set Type 1 per ASTM D395B of 54% at 70° C., 22 hr Type A and 61% at 125° C., 70 hr Type A. Santoprene™ 9101-80E is a thermoplastic vulcanizate commercially available from ExxonMobil Chemical Co. having a density of 0.97 g/cc per ASTM D792, a Shore A Hardness at 15 seconds and 23° C. per ISO 868 of 80, a compression set Type 1 per ASTM D395B of 48% at 70° C., 22 hr Type A and 48% at 125° C., 70 hr Type A. F180A is a polypropylene homopolymer commercially available from Sunoco having a MFR at 2.16 kg and 230° C. of 17 g/10 min per ASTM D1238, a Hardness of 104 per ASTM D785, Tensile Strength at Yield of 35.2 MPa per ASTM D638 at 2 in/min and 50 mm/min, an Elongation at Yield of 9% per ASTM D638 at 2 in/min and 50 mm/min, a Flexural Modulus 1% Secant of 1520 MPa per ASTM D790A at 0.05 in/min and 1.3 mm/min, and Notched Izod Impact of 0.374 J/cm per ASTM D256A. Metablen MZX-4 is a homopolymer polypropylene with 20 wt % of A-3000 processing aid commercially available from Mitsubishi Chemicals. PP5341 is a polypropylene homopolymer commercially available from ExxonMobil Chemical Company with a density of 0.9 g/cc and a MFR of 0.83 g/10 min (ASTM D1238; 230° C. and 2.16 kg weight).

TABLE 3.1

Example 3 TPV Formulations (phr)

| Sample | 1-1 | 1-2 | 1-3 | 1-4 | 1-5 | 1-6 | 1-7 | 1-8 | 1-9 | 1-10 | 1-11 |
|---|---|---|---|---|---|---|---|---|---|---|---|
| Santoprene 101-87 | 100 | 100 | 100 | 100 | 100 | 100 | 100 | 100 | 100 | 100 | 0 |
| PP5341 | 10 | 20 | 30 | 40 | 50 | 0 | 0 | 0 | 0 | 0 | 0 |
| HMS PP-2 | 0 | 0 | 0 | 0 | 0 | 10 | 30 | 0 | 0 | 0 | 0 |
| F180A | 0 | 0 | 0 | 0 | 0 | 0 | 0 | 10 | 30 | 0 | 0 |
| Santoprene 103-40 | 0 | 0 | 0 | 0 | 0 | 0 | 0 | 0 | 0 | 0 | 100 |
| Total phr | 110 | 120 | 130 | 140 | 150 | 110 | 130 | 110 | 130 | 100 | 100 |

TABLE 3.2

Example 3 TPV Formulations (phr), continued

| Sample | Control | 2-1 | 2-2 | 2-3 | 2-4 | 2-5 | 2-6 | 2-7 |
|---|---|---|---|---|---|---|---|---|
| Santoprene 101-87 | 100 | 100 | 100 | 100 | 100 | 100 | 0 | 0 |
| Santoprene 9101-80E | 0 | 0 | 0 | 0 | 0 | 0 | 100 | 0 |
| HMS PP-1 | 0 | 0 | 0 | 30 | 0 | 0 | 0 | 100 |
| Metablen MZX-4 | 0 | 0 | 0 | 0 | 30 | 0 | 0 | 0 |
| HMS PP-2 | 0 | 30 | 0 | 0 | 100 | 200 | 50 | 0 |
| Total phr | 100 | 130 | 130 | 130 | 200 | 300 | 150 | 100 |

Figure 5:
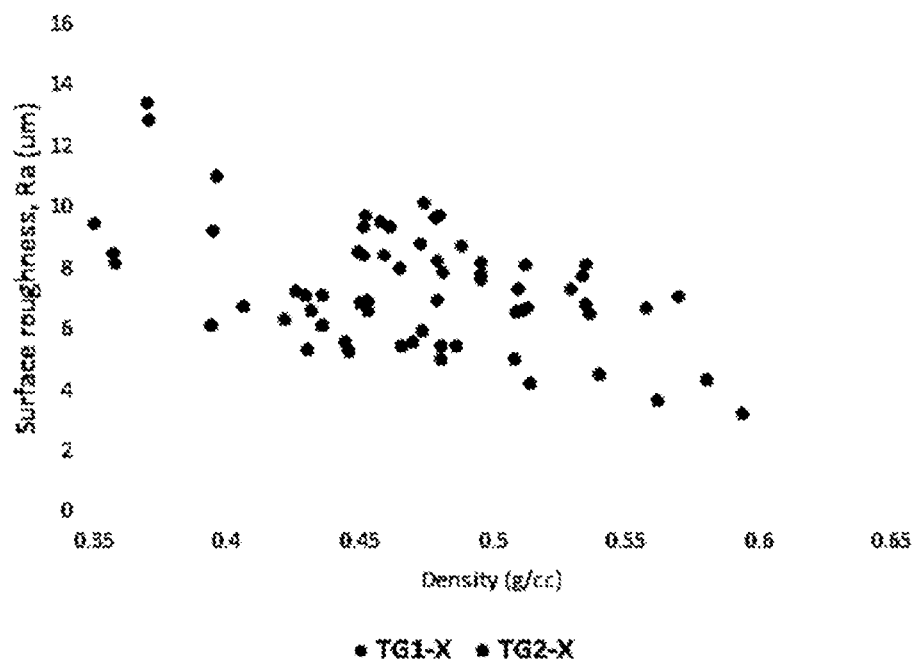
FIG. 5 is a graph showing surface roughness vs. density for foamed TPV articles in connection with Example 3.

FIG. 5 shows that surface roughness data versus density for all TPV compositions of Tables 3.1 and 3.2.

Example 4

Figure 6:
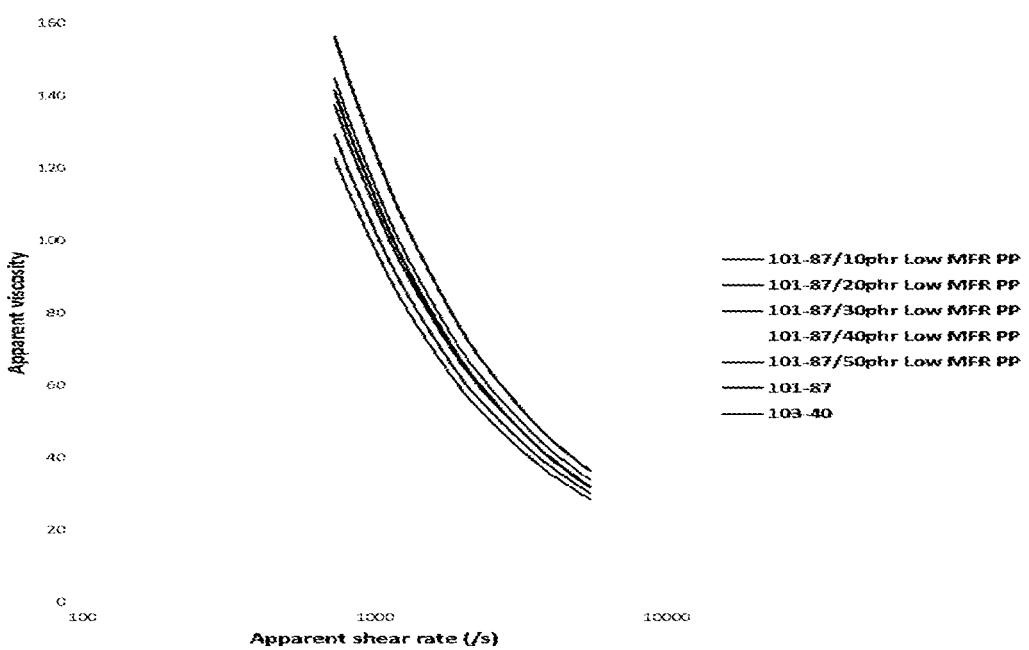
FIG. 6 is a graph showing viscosity vs. shear rate for foamed TPV articles in connection with Example 4.
Figure 7:
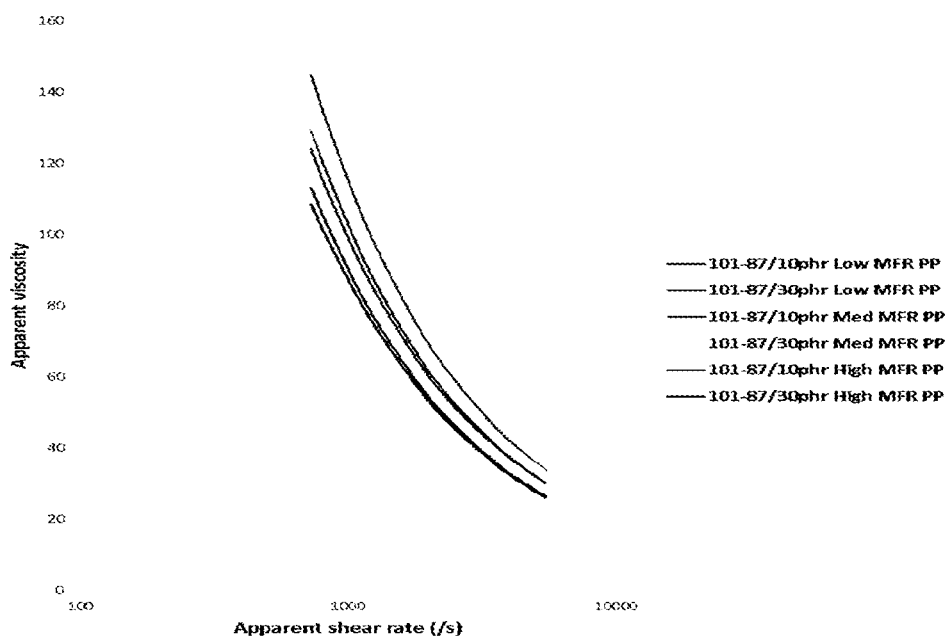
FIG. 7 is a graph showing viscosity vs. shear rate for additional foamed TPV articles in connection with Example 4.
Figure 8:
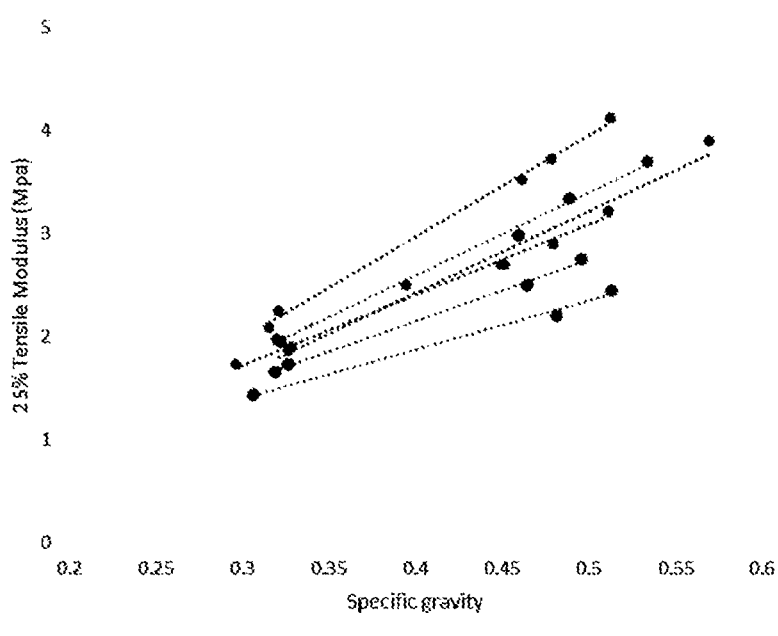
FIG. 8 is a graph showing tensile modulus vs. density for foamed TPV articles in connection with Example 4.
Figure 9:
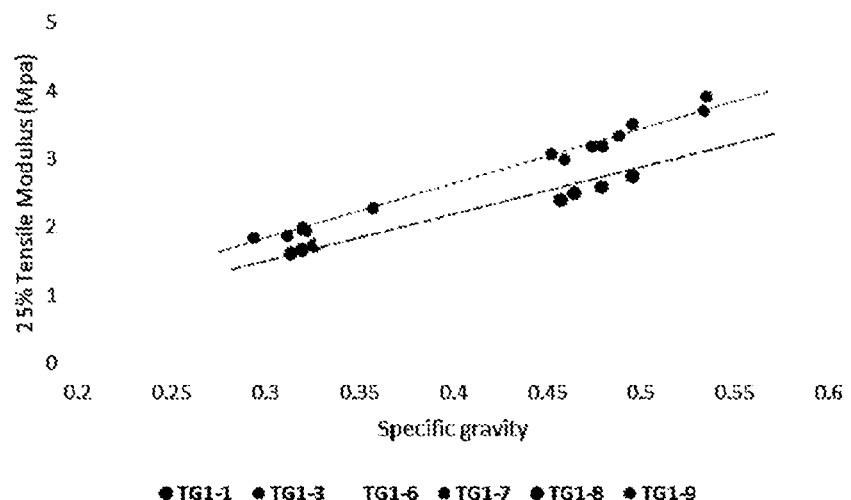
FIG. 9 is a graph showing tensile modulus vs. density for additional foamed TPV articles in connection with Example 4.
Figure 10:
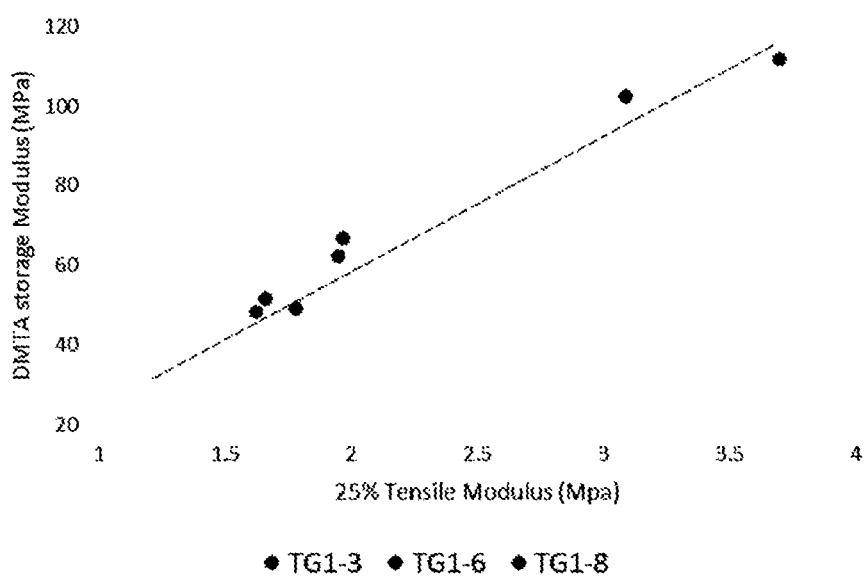
FIG. 10 is a graph showing storage modulus vs. tensile modulus for foamed TPV articles in connection with Examples 4.

In Example 4, the effect of the type and amount of the thermoplastic resin on the TPV formulations of Table 3.1 were analysed. FIG. 6 and FIG. 7 show that the viscosity of the formulation is a function of the type and amount of thermoplastic resin used in the TPV formulation. FIG. 8 and FIG. 9 show that the tensile modulus can be controlled by the amount of the thermoplastic resin, regardless of the melt flow rate/type/grade of the resin. FIG. 10 shows that the storage modulus of the formulations may also be controlled by the amount of the thermoplastic resin, based on the linear relationship between the tensile modulus and the storage modulus.

Test Methods

Shore A Hardness, 25% tensile modulus, (or modulus at 25% extension), elongation at break, ultimate tensile strength, and tension set are measured as per the previous description in the specification.

Extrusion surface roughness ("ESR") is reported as an arithmetic average of surface irregularity (Ra) in microinches (or micrometers, where indicated). Surface irregularity was measured on an extruded foamed sample using a model EMD-04000-W5 Surfanalyzer System 4000 including a universal probe 200 mg stylus force and a Surfanalyzer proper tip type EPT-01049 (0.025 mm (0.0001") stylus radius).

Molecular Weight and Composition Distribution by GPC-3D: Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with online differential refractive index (DRI), light scattering (LS), and viscometer (VIS) detectors. It uses three Polymer Laboratories PLgel 10 μm Mixed-B LS columns for separation using a flow rate of 0.54 ml/min and a nominal injection volume of 300 microliter, calibrated with polystyrene standard. The detectors and columns were contained in an oven maintained at 145° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference. This GPC SEC-DRI-LS-VIS method may also be referred to by the shorthand "GPC-3D."

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10 M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cc, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer and $A_2$=0.0015−0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm. For purposes of this application, where DRI and LS measurements conflict, LS measurements should be used for Mw and Mz, while DRI measurements should be used for Mn. And, although MWD (polydispersity) is taken as Mw/Mn, where DRI and LS measurements conflict, MWD should be determined as Mw (measured by LS)/Mn (measured by DRI), or $Mw_{LS}/Mn_{DRI}$.

Molecular weight distribution and Composition Distribution by GPC-IR (GPC-4D): Where indicated, GPC-IR (sometimes also referred to as GPC-4D) may instead be used to determine the distribution and the moments of molecular weight (e.g., Mn, Mw, Mz, etc.) and/or the comonomer distribution (C2, C3, C6, etc.). According to the GPC-IR procedure, distribution and moments of molecular weight and/or comonomer distribution are determined with a high temperature Gel Permeation Chromatography (Polymer-Char GPC-IR) equipped with a multiple-channel band filter based infrared (IR) detector ensemble IR5, in which a broad-band channel is used to measure the polymer concentration while two narrow-band channels are used for characterizing composition. Three Agilent PLgel 10 μm Mixed-B LS columns, calibrated with polystyrene standard, are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 micrometer Teflon filter and degassed with an online degasser before entering the GPC instrument. The nominal flow rate is 1.0 mL/min and the nominal injection volume is 200 microliter. The whole system including transfer lines, columns, detectors are contained in an oven maintained at 145° C. Given amount of polymer sample is weighed and sealed in a standard vial with 10 microliter flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at 22° C. and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the following equation:

$$c = \alpha I$$

where α is the mass constant determined with PE standard NBS1475. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of mono-dispersed polystyrene (PS) standards. The molecular weight is calculated at each elution volume with following equation.

$$\log M_X = \frac{\log(K_X/K_{PS})}{a_X + 1} + \frac{a_{PS} + 1}{a_X + 1} \log M_{PS}$$

where K and α are the coefficients in the Mark-Houwink equation. The variables with subscript "X" stand for the test sample while those with subscript "PS" stand for polystyrene. In this method, $a_{PS}$=0.67 and $K_{PS}$=0.000175 while $a_X$ and $K_X$ are determined based on the composition of linear ethylene/propylene copolymer and linear ethylene-propylene-diene terpolymers using a standard calibration procedure. See T. Sun, P. Brant, R. R. Chance, and W. W. Graessley, "Effect of Short Chain Branching on the Coil Dimensions of Polyolefins in Dilute Solution," Macromolecules, Volume 34, Number 19, pp. 6812-6820, (2001). The comonomer composition is determined by the ratio of the IR detector intensity corresponding to $CH_2$ and $CH_3$ channel calibrated with a series of PE and PP homo/copolymer standards whose nominal value are predetermined by NMR. For purposes of the present application, $K_X=0.000579$ and $\alpha_X=0.695$ for ethylene polymers, and $K_X=0.0002288$ and $\alpha_X=0.705$ for propylene polymers. For EP, the values of $K_X$ and $\alpha_X$ are determined based on the ethylene/propylene composition using a standard calibration procedure such that: $K_x=(1-0048601 EP-6.8989\times10^{-6}EP^2)\times5.7\times10^{-4}$ $(200000)^{-Trunc(0.1EP)/1000}$ and $\alpha_X=0.695+Trunc(0.1EP)/1000$, where EP is the weight percent of propylene in the EP, and Trunc indicates that only the integer portion is kept in the calculation. For example, Trunc(5.3)=5.

Either GPC-SEC (GPC-3D) or GPC-IR (GPC-4D) may be used to determine molecular weights, molecular weight distributions, and/or composition distributions, as specified in context herein. Where neither method is specified, or where results of the two methods conflict, it is preferred to use the GPC-SEC (GPC-3D) method detailed above.

All documents described herein are incorporated by reference herein. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A composition comprising:
   (a) 100 parts by weight of a thermoplastic vulcanizate (TPV) composition comprising (i) an at least partially vulcanized rubber component dispersed within a continuous thermoplastic component comprising a first thermoplastic resin; (ii) process oil; and (iii) one or more additives; and
   (b) 20 to 200 parts by weight of a high melt-strength thermoplastic resin having melt strength greater than 20 cN (determined using an extensional rheometer at 190° C.), molecular weight distribution (MWD, Mw/Mn) greater than 5, melt flow rate (MFR) within the range from 0.1 to 60.0 g/10 min (ASTM D1238 Condition L, 230° C. and 2.16 kg), and one or more of the following properties:
      (b-i) Heat distortion temperature greater than or equal to 120° C.;
      (b-ii) Flexural modulus (1% secant) per ASTM D790A (using a crosshead speed of 1.26 mm/min and a support span of 50.8 mm) within the range from 1600 to 2500 MPa;
      (b-iii) Tensile stress at yield (measured per ASTM D638, with a crosshead speed of 50.8 mm/min and a gauge length of 50.8 mm) within the range from 30 to 60 MPa;
      (b-iv) Notched Izod Impact Strength (ASTM D256 at 21° C.) within the range from 5 to 65 J/m; and
      (b-v) branching index (g') of at least 0.95;
   wherein composition has a density of less than about 0.55 g/cc.

2. The composition of claim 1, wherein the composition is made by coextrusion.

3. The composition of claim 1, wherein the composition is made by melt-mixing.

4. The composition of claim 1, wherein the rubber component comprises ethylene-propylene-diene (EPDM) terpolymer, and the first thermoplastic resin comprises homopolypropylene.

5. The composition of claim 1, wherein the high melt-strength thermoplastic resin is a homopolypropylene that is different from the first thermoplastic resin.

6. The composition of claim 5, wherein the high melt-strength thermoplastic resin has three or more of the properties (b-i) to (b-v).

7. The composition of claim 6, wherein the high melt-strength thermoplastic resin has all of the properties (b-i) to (b-v).

8. The composition of claim 1, wherein the composition is made by combining 100 parts by weight of the TPV composition and 30 to 200 parts by weight of the high melt-strength thermoplastic resin.

9. A foamed composition made by combining (i) 90 to 99.9 parts by weight of the composition claim 1 with (ii) 0.1 to 10 parts by weight of a foaming agent.

10. The foamed composition of claim 9, wherein the foaming agent comprises thermo-expandable microspheres.

11. The foamed composition of claim 10, wherein the thermo-expandable microspheres are dispersed in a carrier resin as a masterbatch.

12. The foamed composition of claim 9, further having one or more of the following properties:
   (a) 25% tensile modulus within the range from 1 to 6 MPa;
   (b) Extrusion surface roughness (ESR) less than 8.0 µm;
   (c) Elongation at break (ASTM D412, Die C, at 23° C. and 50 mm/min) within the range from 80% to 130%; and
   (d) Hardness (Shore A, ASTM D2250 with 15 sec delay) within the range from 60 to 90.

13. The foamed composition of claim 12, having all three properties (a)-(c).

14. A method comprising mixing:
   (a) a thermoplastic vulcanizate composition or formulation comprising (a-i) a rubber component that is optionally at least partially vulcanized, (a-ii) a thermoplastic component comprising a first thermoplastic resin, (a-iii) process oil, and (a-iv) one or more additives;
   (b) a high melt-strength thermoplastic resin having melt strength greater than 20 cN (determined using an extensional rheometer at 190° C.), molecular weight distribution (MWD, Mw/Mn) greater than 5, melt flow rate (MFR) within the range from 0.1 to 60.0 g/10 min (ASTM D1238 Condition L, 230° C. and 2.16 kg), and one or more of the following properties:
      (b-i) Heat distortion temperature greater than or equal to 120° C.;
      (b-ii) Flexural modulus (1% secant) per ASTM D790A (using a crosshead speed of 1.26 mm/min and a support span of 50.8 mm) within the range from 1600 to 2500 MPa;
      (b-iii) Tensile stress at yield (measured per ASTM D638, with a crosshead speed of 50.8 mm/min and a gauge length of 50.8 mm) within the range from 30 to 60 MPa;
      (b-iv) Notched Izod Impact Strength (ASTM D256 at 21° C.) within the range from 5 to 65 J/m; and
      (b-v) branching index (g') of at least 0.95; and
   (c) a foaming agent.

15. The method of claim 14, wherein the rubber (a-i) of thermoplastic vulcanizate composition (a) is at least partially vulcanized and dispersed within the thermoplastic component (a-ii).

16. The method of claim 14, wherein the thermoplastic vulcanizate composition or formulation (a), the high melt-strength thermoplastic resin (b), and the foaming agent (c) are combined in the following relative amounts: (a) 30 to 76.85 parts by weight thermoplastic vulcanizate composition or formulation; (b) 20.8 to 66.6 parts by weight high melt-strength thermoplastic resin; and (c) 0.1 to 10 parts by weight foaming agent.

17. The method of claim 14, wherein the foaming agent comprises thermo-expandable microspheres.

18. The method of claim 14, further comprising obtaining a foamed article having a density of less than about 0.55 g/cc and one or more of the following properties:
- (A) 25% tensile modulus within the range from 1 to 6 MPa;
- (B) Extrusion surface roughness (ESR) less than 8.0 µm;
- (C) Elongation at break (ASTM D412, Die C, at 23° C. and 50 mm/min) within the range from 80% to 130%; and
- (D) Hardness (Shore A, ASTM D2250 with 15 sec delay) within the range from 60 to 90.

19. The method of claim 14, wherein the foamed article has all of the properties (A)-(D).

20. The method of claim 14, wherein the foamed article is a base of a glass run channel.

\* \* \* \* \*